(12) United States Patent
Szekely et al.

(10) Patent No.: US 9,033,612 B2
(45) Date of Patent: May 19, 2015

(54) DETECTABLE WARNING AND GUIDANCE TILES

(75) Inventors: Kenneth Szekely, Oakville (CA); William Crookes, Ann Arbor, MI (US)

(73) Assignee: Astra Capital Incorporated, Oakville, Ontario (CA)

( * ) Notice: Subject to any disclaimer, the term of this patent is extended or adjusted under 35 U.S.C. 154(b) by 1027 days.

(21) Appl. No.: 12/374,452

(22) PCT Filed: Jul. 19, 2007

(86) PCT No.: PCT/CA2007/001265
§ 371 (c)(1),
(2), (4) Date: Apr. 1, 2010

(87) PCT Pub. No.: WO2008/009113
PCT Pub. Date: Jan. 24, 2008

(65) Prior Publication Data
US 2012/0275858 A1  Nov. 1, 2012

Related U.S. Application Data

(60) Provisional application No. 60/807,758, filed on Jul. 19, 2006.

(51) Int. Cl.
*E01C 19/00* (2006.01)
*E01C 11/24* (2006.01)
*A61H 3/06* (2006.01)
*E01C 5/20* (2006.01)
*E04F 15/02* (2006.01)
*G09B 21/00* (2006.01)

(52) U.S. Cl.
CPC ............ *E01C 11/24* (2013.01); *A61H 3/066* (2013.01); *E01C 5/20* (2013.01); *E04F 15/02* (2013.01); *G09B 21/003* (2013.01); *G09B 21/008* (2013.01)

(58) Field of Classification Search
CPC ..... E01F 9/0122; A61H 3/066; G09B 21/003; G09B 21/008; E01C 11/24
USPC .............. 404/9, 34, 75; 116/205; 428/128, 98
See application file for complete search history.

(56) References Cited

U.S. PATENT DOCUMENTS

| | | |
|---|---|---|
| 4,620,816 A | 11/1986 | Kupfer |
| 5,271,690 A | 12/1993 | Fennessy |
| 5,385,770 A * | 1/1995 | Julnes ........................ 428/195.1 |
| 5,395,673 A * | 3/1995 | Hunt ............................. 428/148 |
| 5,775,835 A | 7/1998 | Szekely |

(Continued)

OTHER PUBLICATIONS

International Search Report from counterpart International Application No. PCT/CA2007/001265.

(Continued)

*Primary Examiner* — Raymond W Addie
(74) *Attorney, Agent, or Firm* — Peter K. Sollins; Foley Hoag LLP

(57) ABSTRACT

The present invention relates to an ADA compliant detectable warning or guidance tile for pedestrian platforms, walkways, and sidewalks and the like having a detectable warning surface containing raised truncated domes detectable by the visually impaired in accordance with Americans with Disabilities Act (ADA): Accessibility Guidelines for Buildings and Facilities and being provided with one or more additional means on the top surface of the tile to provide visual or tactile information to sighted and visually impaired pedestrians.

12 Claims, 25 Drawing Sheets

(56) References Cited

U.S. PATENT DOCUMENTS

| | | | |
|---|---|---|---|
| D399,011 S * | 9/1998 | Berger | D25/163 |
| 6,350,823 B1 | 2/2002 | Goeb | |
| 6,718,714 B1 * | 4/2004 | Montgomery, Sr. | 52/392 |
| 7,001,103 B2 | 2/2006 | Sippola | |
| 7,261,052 B1 * | 8/2007 | Holmes | 116/205 |
| 7,955,024 B2 * | 6/2011 | Driscoll et al. | 404/19 |
| 8,082,872 B2 * | 12/2011 | Cook et al. | 116/205 |
| 2005/0013662 A1 * | 1/2005 | Provenzano | 404/75 |
| 2005/0255273 A1 | 11/2005 | Gorman | |
| 2006/0039752 A1 * | 2/2006 | Hyams | 404/19 |
| 2006/0188680 A1 * | 8/2006 | Everett | 428/40.1 |
| 2006/0210766 A1 * | 9/2006 | Press et al. | 428/119 |
| 2007/0086859 A1 * | 4/2007 | Julnes | 404/19 |
| 2007/0196169 A1 * | 8/2007 | Logan et al. | 404/9 |
| 2009/0032590 A1 * | 2/2009 | Hopkins | 235/385 |

OTHER PUBLICATIONS

The Americans with Disabilities Act Accessibility Guidelines for Building and Facilities [online], 2002 (retrieved May 26, 2011) Retrieved from the Internet: <URL: http://access-board.gov/adaag/ADAAG.pdf>.

* cited by examiner

Section A-A

Fig.19B
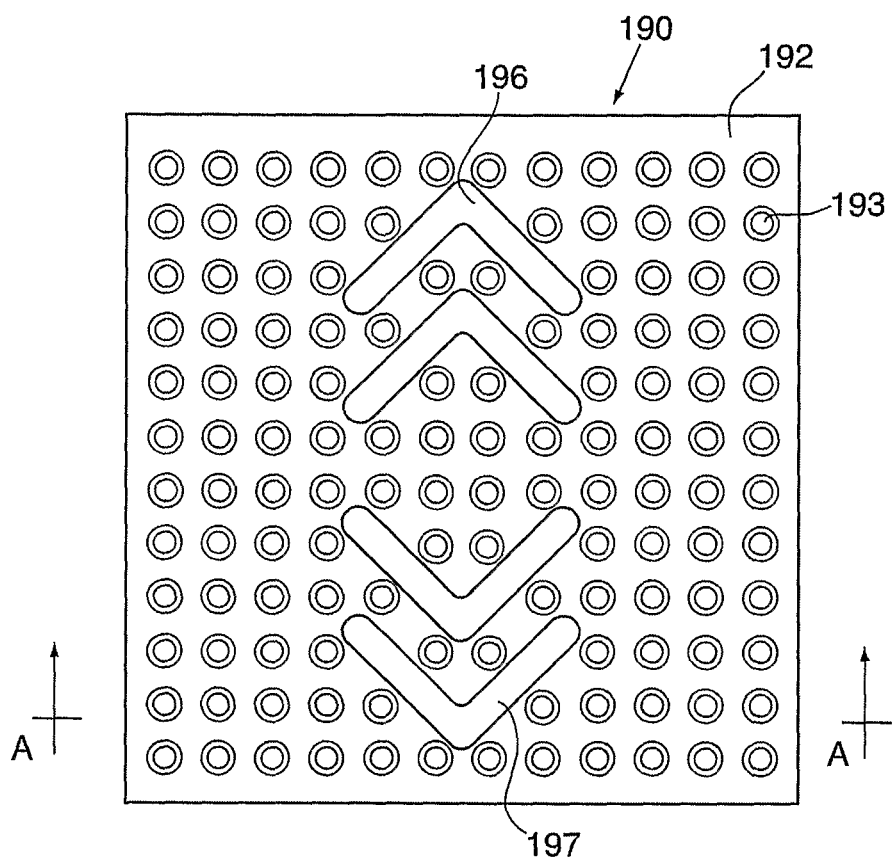
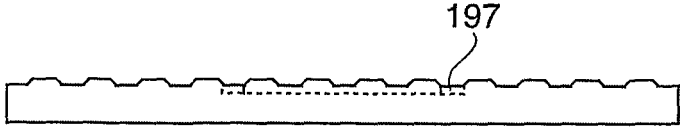
Section A-A

Section A-A

Fig.19D
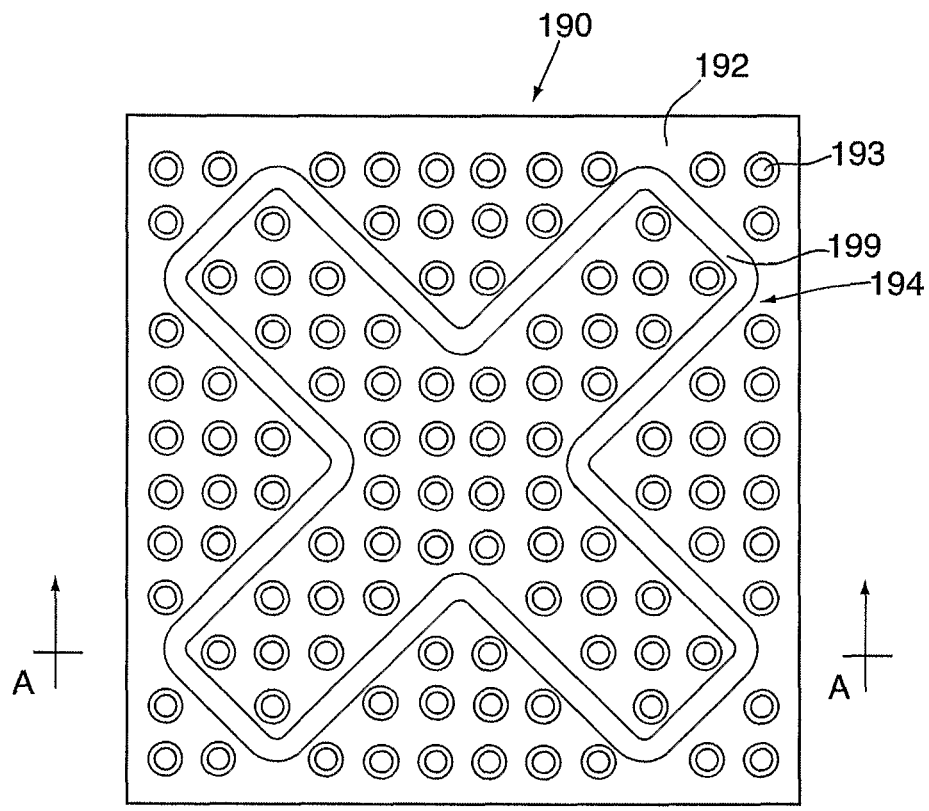
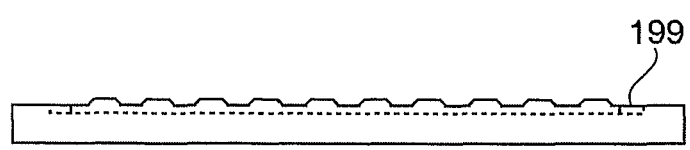
Section A-A

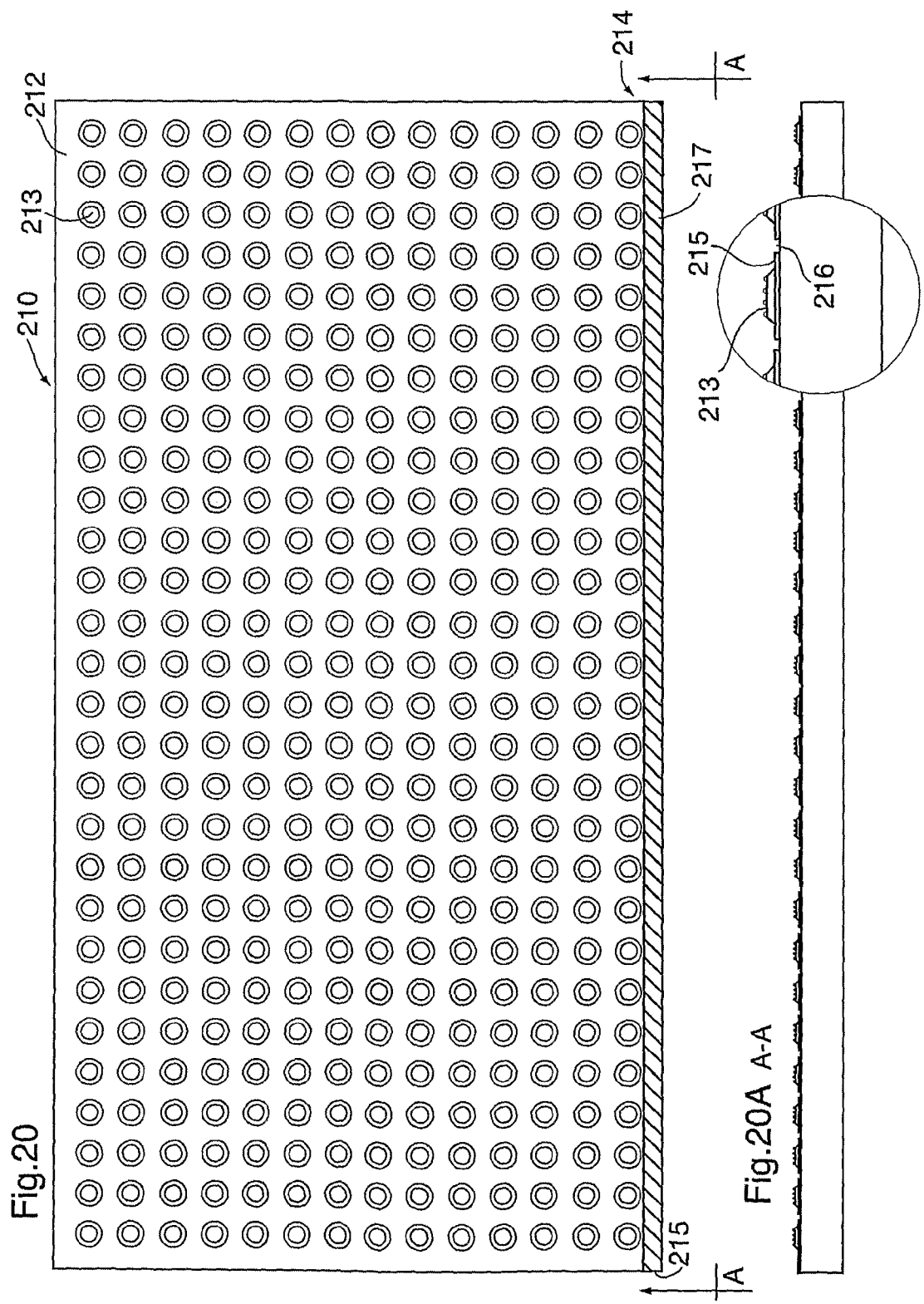

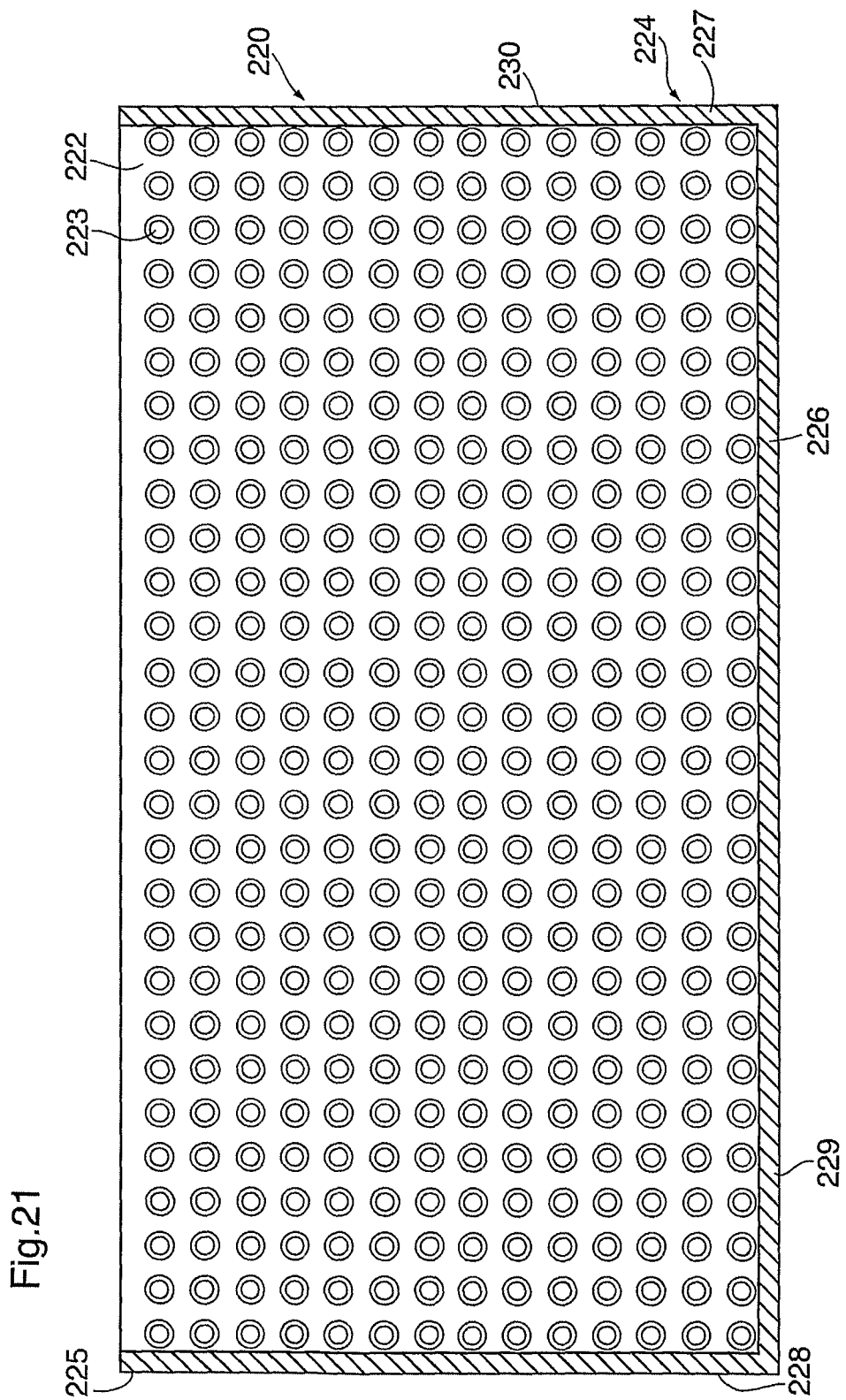

DETECTABLE WARNING AND GUIDANCE TILES

FIELD OF THE INVENTION

This invention relates generally to pedestrian platforms, walkways, and sidewalks and the like, and specifically to textured tiles which assist pedestrians, particularly those who are blind, visually or physically impaired, young children or the elderly in following a walkway or in detecting the location of a sidewalk edge, platform edge or other similar hazard.

BACKGROUND OF THE INVENTION

In connection with pedestrian platforms, walkways, and sidewalks in locations such as subway or railway stations, loading docks, stages, speaking platforms, stairways, sidewalks, school crossings, airports, curb ramps, crosswalks and roadway crossings, etc. there is a requirement for pedestrians to be able to safely navigate and avoid hazards. The requirement is particularly acute in attempting to make such facilities accessible and safe for blind or visually impaired persons.

In the 1980's a series of studies were undertaken in the United States to improve the design of buildings and transportation facilities to improve the mobility of the visually impaired. These studies culminated in recommendations on making potential hazards detectable to the visually impaired either by use of the long cane or underfoot.

Americans with Disabilities Act (ADA): Accessibility Guidelines for Buildings and Facilities set the requirements for the use of detectable warnings to warn visually impaired persons of hazards. The Guidelines require that detectable warnings shall consist of raised truncated domes of prescribed diameter, height and center-to-center spacing and shall contrast visually with adjoining surfaces. Detectable warnings used on interior surfaces are required to differ from adjoining surfaces in resiliency or sound-on-cane contact. Various tactile tiles having raised truncated domes in compliance with the ADA Guidelines or the equivalent have been developed such as those shown in U.S. Pat. Nos. 4,715,743 and 5,303,669.

SUMMARY OF THE INVENTION

The present invention provides improved tactile tiles providing enhanced directional guidance features and greater color contrast from the surrounding walkway to improve detection and recognition.

Further features of the invention will be described or will become apparent in the course of the following detailed description.

BRIEF DESCRIPTION OF THE DRAWINGS

In order that the invention may be more clearly understood, the preferred embodiments will now be described in detail by way of example, with reference to the accompanying drawings, in which:

FIG. 19a-d are top plan views of other embodiments of ADA compliant detectable tiles according to the present invention featuring added grooves between domes to provide directional and other information.

FIG. 20 is a top plan view of another embodiment of ADA compliant detectable tiles according to the present invention featuring a photoluminescent strip on one edge of the tile to detect the base of a curb ramp, edge or platform, or the location of a hazardous vehicular way.

FIG. 20a is a side view of a raised section on one edge of the of the tile to provide a warning or to detect the base of the curb ramp and contains drainage grooves.

FIG. 21 is a top plan view of another embodiment of ADA compliant detectable tiles according to the present invention featuring photoluminescent strips on each end of the tile and on the base of the tile to provide direction of travel guidance.

DETAILED DESCRIPTION OF THE PREFERRED EMBODIMENT

Figure 1:
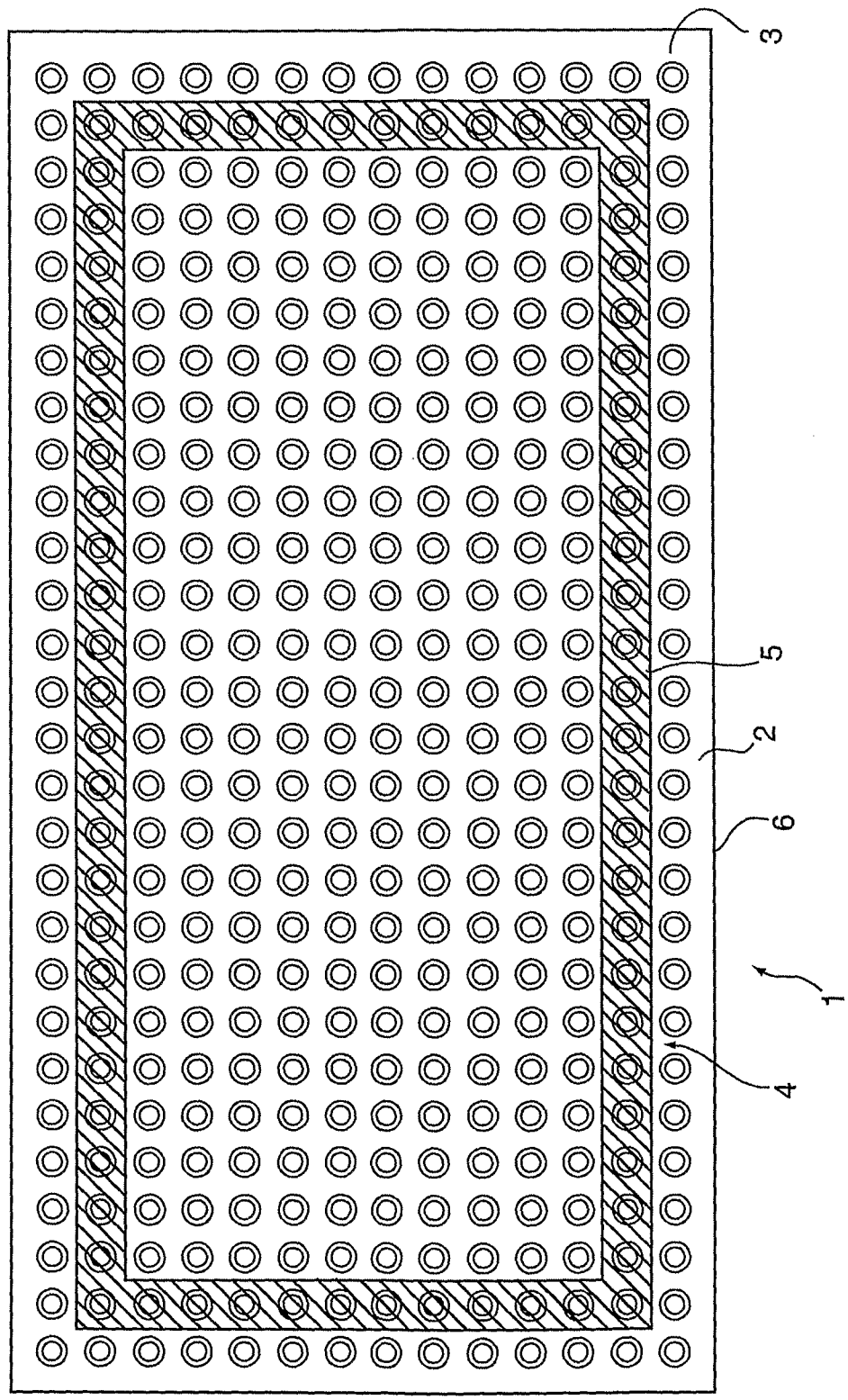
FIG. 1 is a top plan view of one embodiment of an ADA compliant detectable tile according to the present invention featuring a border of contrasting color to the tile.

Referring to FIG. 1, one embodiment of an ADA compliant detectable tile, generally indicated at 1, according to the present invention, generally similar to the type of tiles described in U.S. Pat. Nos. 5,303,669 and 5,775,835 or the like, has a top surface 2 with a plurality of rows of raised truncated domes 3. The tile 1, of the present invention, features a symbol, generally indicated at 4, of contrasting color to the top surface of the tile. In the embodiment illustrated, the symbol 4 is formed with an internal border 5 of contrasting color around the periphery 6 of the top surface 2 of the tile. The border provides contrast and draws the eye of the pedestrian to ensure a visual warning is provided and to add directional guidance to the intended path. The color of the tiles is preferably selected from the group consisting of Federal Yellow, Ochre Yellow, Brick Red, Colonial Blue, Ocean Blue, Onyx Black, Dark Gray, Light Gray or Pear White (as identified on the www.armor-tile.com web site). Where the tile is for example Federal Yellow the internal border can be Onyx Black to provide the desired level of contrast. The border is preferably molded into the tile.

Figure 2:
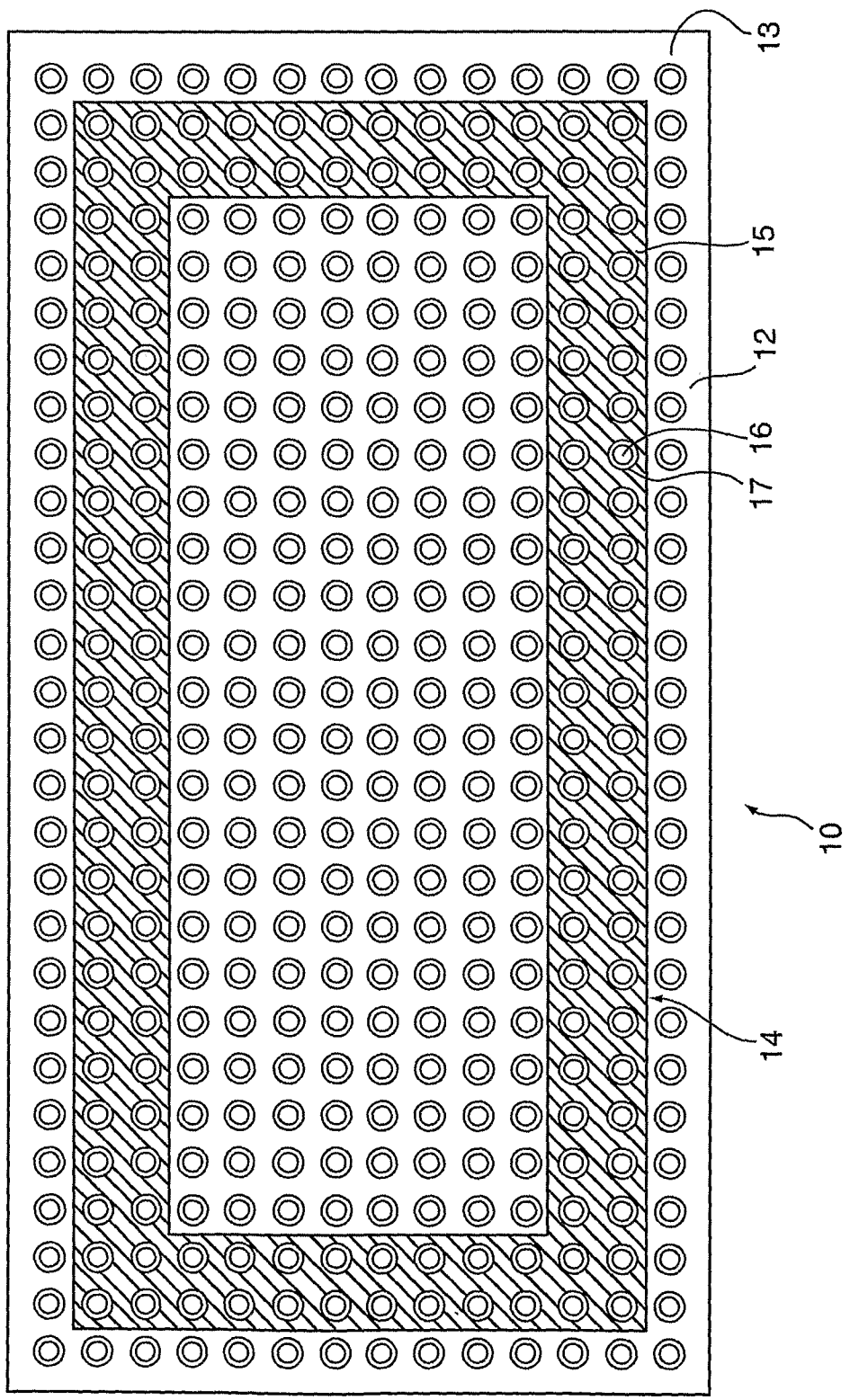
FIG. 2 is a top plan view of another embodiment of an ADA compliant detectable tile according to the present invention featuring a border and domes of contrasting color within the border.

FIG. 2 illustrates another embodiment of a ADA compliant detectable tile, generally indicated at 10, according to the present invention similar to the one shown in FIG. 1 that has a top surface 12 with a plurality of rows of raised truncated domes 13. The tile 10 features a symbol, generally indicated at 14, of contrasting color to the top surface of the tile. In this embodiment the symbol 14 is an internal border 15 of contrasting color to the top surface of the tile. In this embodiment, the tops 16 of the domes 17 within the border are of contrasting color to the border and preferably the same color as the rest of the top surface of the tile. The border 15 with different colored domes 17 provides contrast and draws the eye of the pedestrian to ensure a visual warning is provided and to add directional guidance to the intended path. For example where the tile is Federal Yellow the internal border can be Onyx Black and the tops of the domes can be Federal Yellow to provide the desired level of contrast. The border is preferably molded into the tile.

Figure 3:
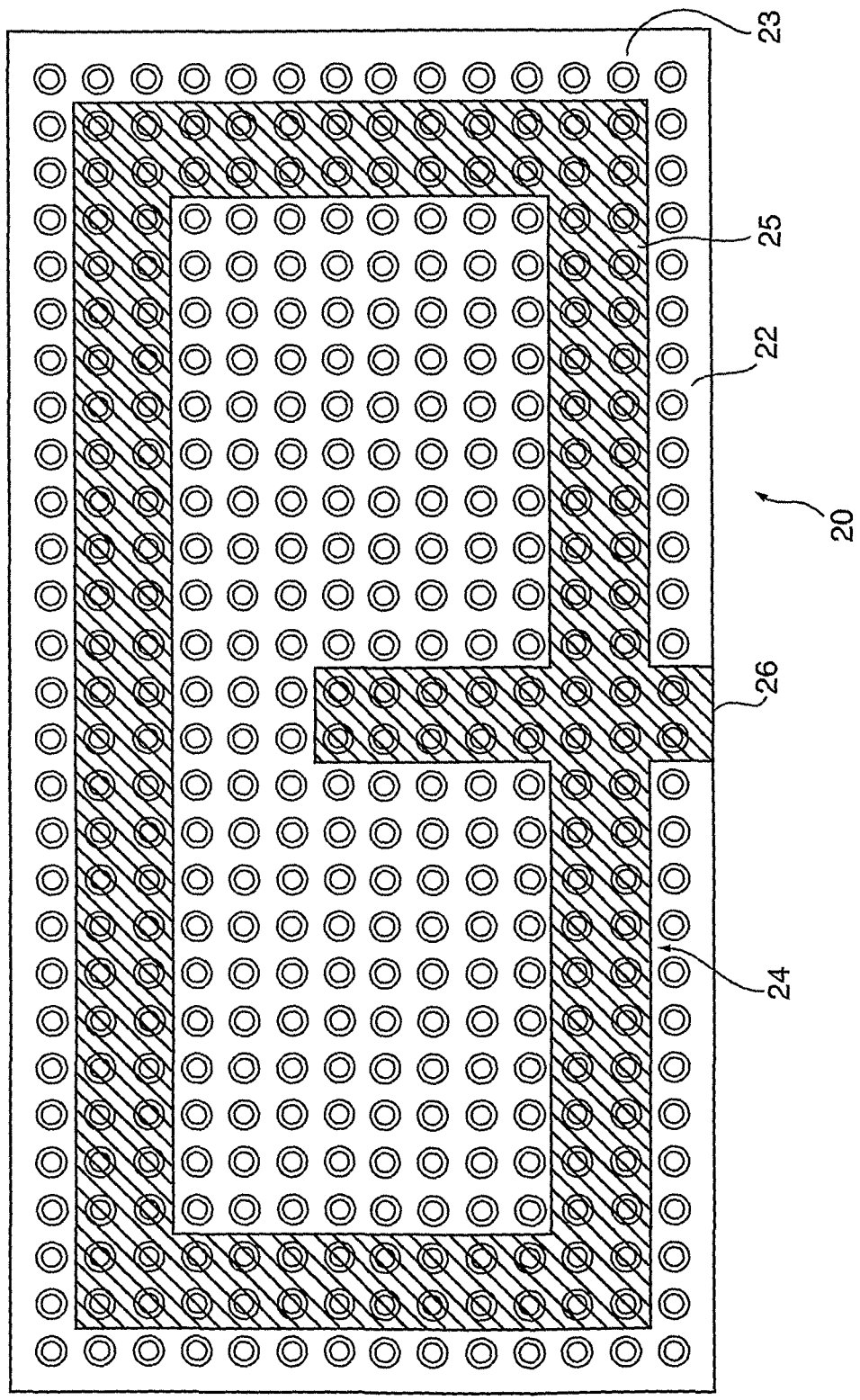
FIG. 3 is a top plan view of another embodiment of an ADA compliant detectable tile according to the present invention featuring a contrasting color border and centering and directional element.

FIG. 3 illustrates another embodiment of an ADA compliant detectable tile, generally indicated at 20, according to the present invention similar to the one shown in FIG. 1 that has a top surface 22 with a plurality of rows of raised truncated domes 23. The tile 20 features a symbol, generally indicated at 24, of contrasting color to the top surface of the tile. In the embodiment illustrated, the symbol 24 features an internal border 25 of contrasting color to the top surface of the tile. In this embodiment, a thick stroke 26 of the same color as the border is added to center and provide direction to the pedestrian regarding the intended path, in the direction indicated by stroke 26.

Figure 4:
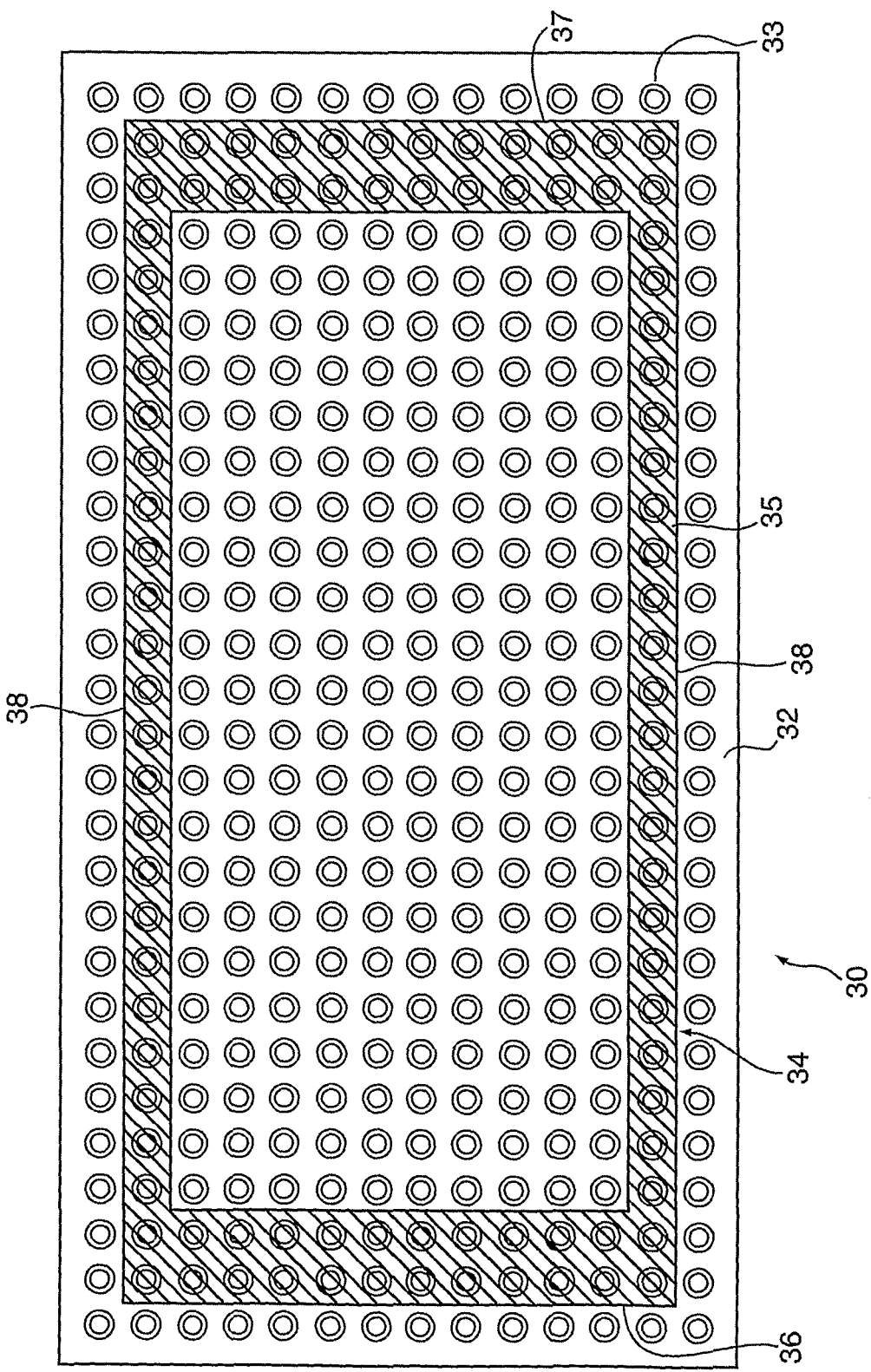
FIG. 4 is a top plan view of another embodiment of an ADA compliant detectable tile according to the present invention featuring a contrasting color border with directional features.

FIG. 4 illustrates another embodiment of an ADA compliant detectable tile, generally indicated at 30, according to the present invention similar to the one shown in FIG. 1 that has a top surface 32 with a plurality of rows of raised truncated domes 33. The tile 30 features a symbol, generally indicated at 34, of contrasting color to the top surface of the tile. In the embodiment illustrated, the symbol 34 is an internal border 35 of contrasting color to the top surface of the tile. In this embodiment, the side edges 36,37 of the border 35 are wider than the other two sides 38,39. This provides directional guidance to the intended path, between the side edges 36,37.

Figure 5:
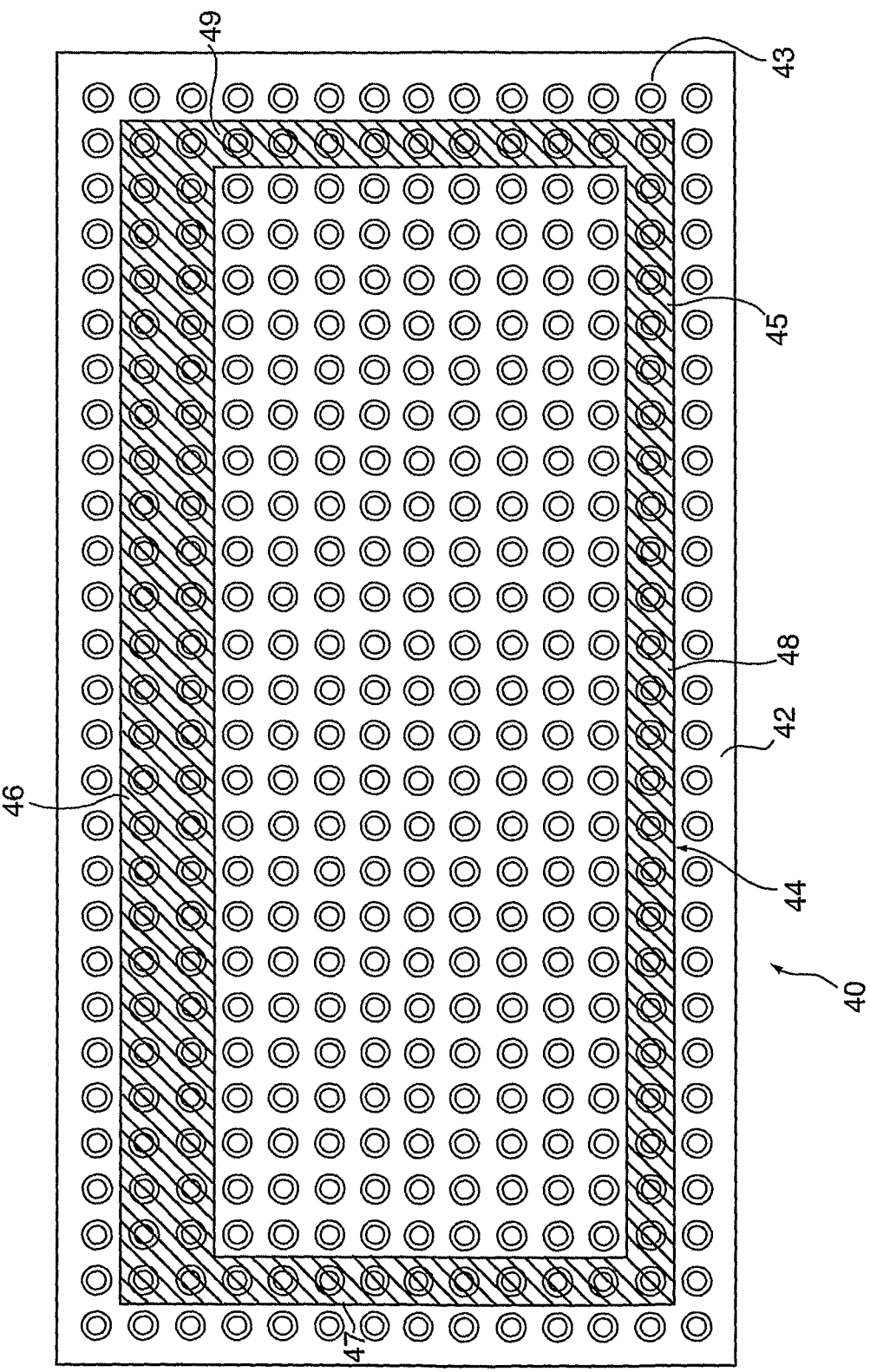
FIG. 5 is a top plan view of another embodiment of an ADA compliant detectable tile according to the present invention featuring a contrasting color border with a thicker border on one side to convey a sense of direction as well as a signal to STOP.

FIG. 5 illustrates another embodiment of an ADA compliant detectable tile, generally indicated at 40, according to the present invention similar to the one shown in FIG. 1 that has a top surface 42 with a plurality of rows of raised truncated domes 43. The tile 40 features a symbol, generally indicated at 44, of contrasting color to the top surface of the tile. In the embodiment illustrated, the symbol 44 is an internal border 45 of contrasting color to the top surface 42 of the tile. In this embodiment, the side 46 of the border 45 closest to the hazard (platform edge, roadway etc.) is wider than the other sides, 47, 48, 49 of the border 45 to convey a sense of direction as well as a signal to STOP.

Figure 6:
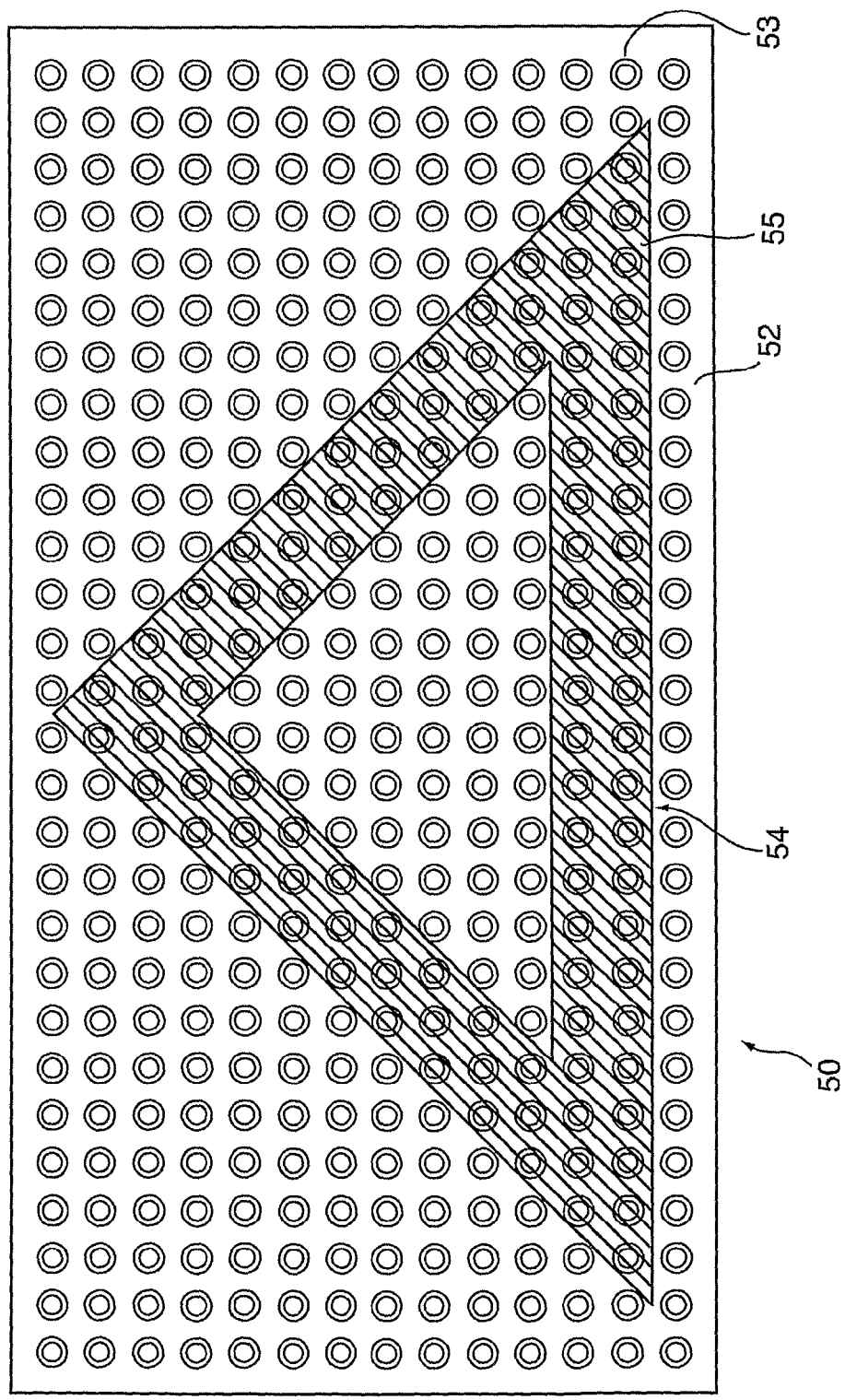
FIG. 6 is a top plan view of another embodiment of an ADA compliant detectable tile according to the present invention featuring a contrasting color symbol to provide directional input.

FIG. 6 illustrates another embodiment of an ADA compliant detectable tile, generally indicated at 50, according to the present invention similar to the one shown in FIG. 1 that has a top surface 52 with a plurality of rows of raised truncated domes 53. The tile 50 features a symbol, generally indicated at 54, of contrasting color to the top surface of the tile. In the embodiment illustrated, the symbol 54, in this case is a triangle 55, of contrasting color formed on the top surface of the tile. Where the tile is for example Federal Yellow the triangle can be Onyx Black to provide the desired level of contrast. The symbol is preferably molded into the tile. The contrasting colored triangle provides contrast and draws the eye of the pedestrian to convey a strong sense of direction and centering to the intended path.

Figure 7:
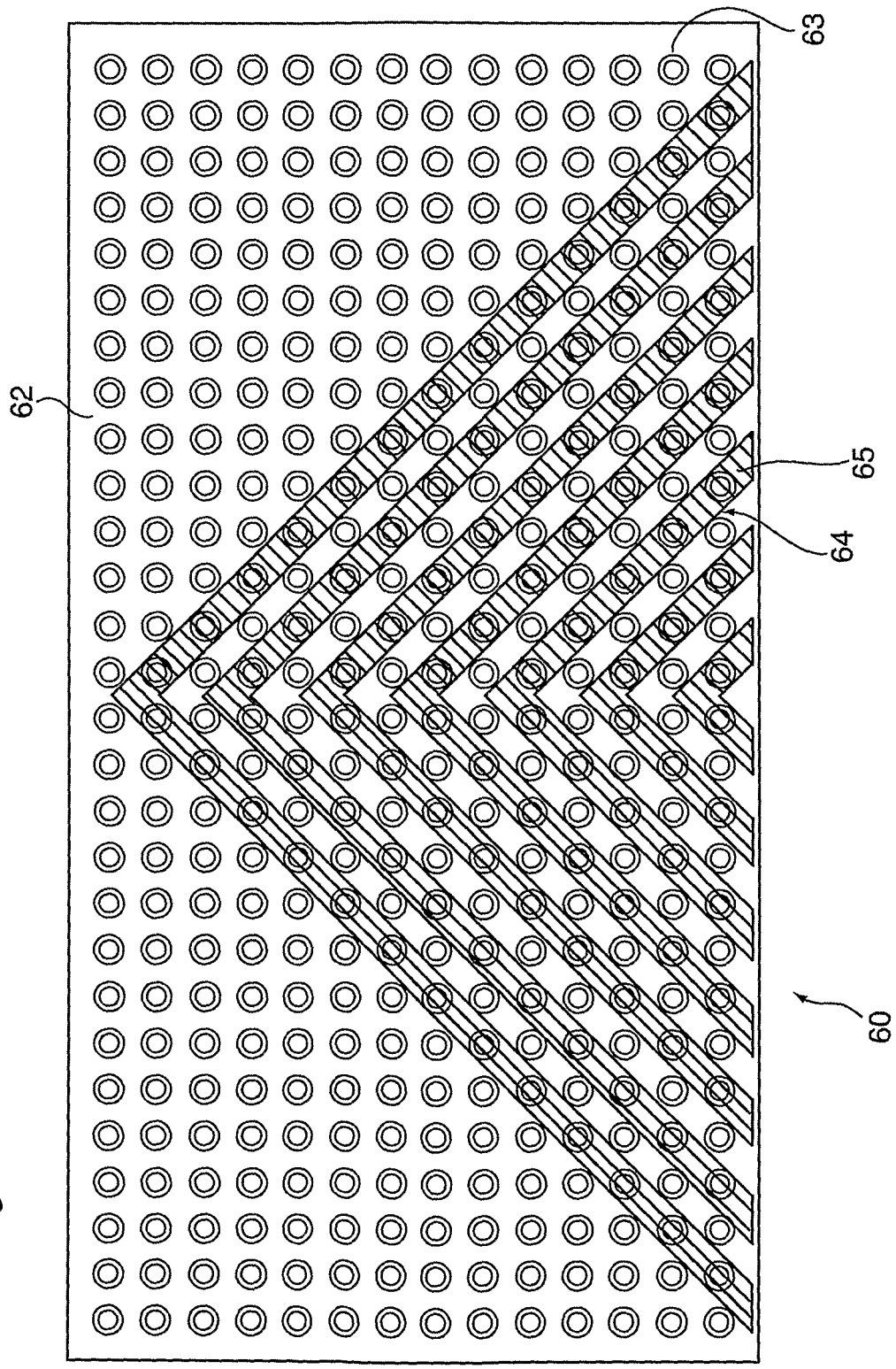
FIG. 7 is a top plan view of another embodiment of an ADA compliant detectable tile according to the present invention featuring contrasting color symbols to provide directional input.

FIG. 7 illustrates another embodiment of an ADA compliant detectable tile, generally indicated at 60, according to the present invention similar to the one shown in FIG. 6 that has a top surface 62 with a plurality of rows of raised truncated domes 63. The tile 60 features a symbol, generally indicated at 64, of contrasting color to the top surface of the tile. In the embodiment illustrated, the symbol 64, in this case is a series of nested chevrons 65, of contrasting color formed on the top surface of the tile. Where the tile is for example Federal Yellow the series of nested chevrons can be Onyx Black to provide the desired level of contrast. The contrasting colored triangles 65 provide contrast and draw the eye of the pedestrian to convey a strong sense of direction and centering to the intended path while at the same time showing more of the base color of the tile surface.

Figure 8:
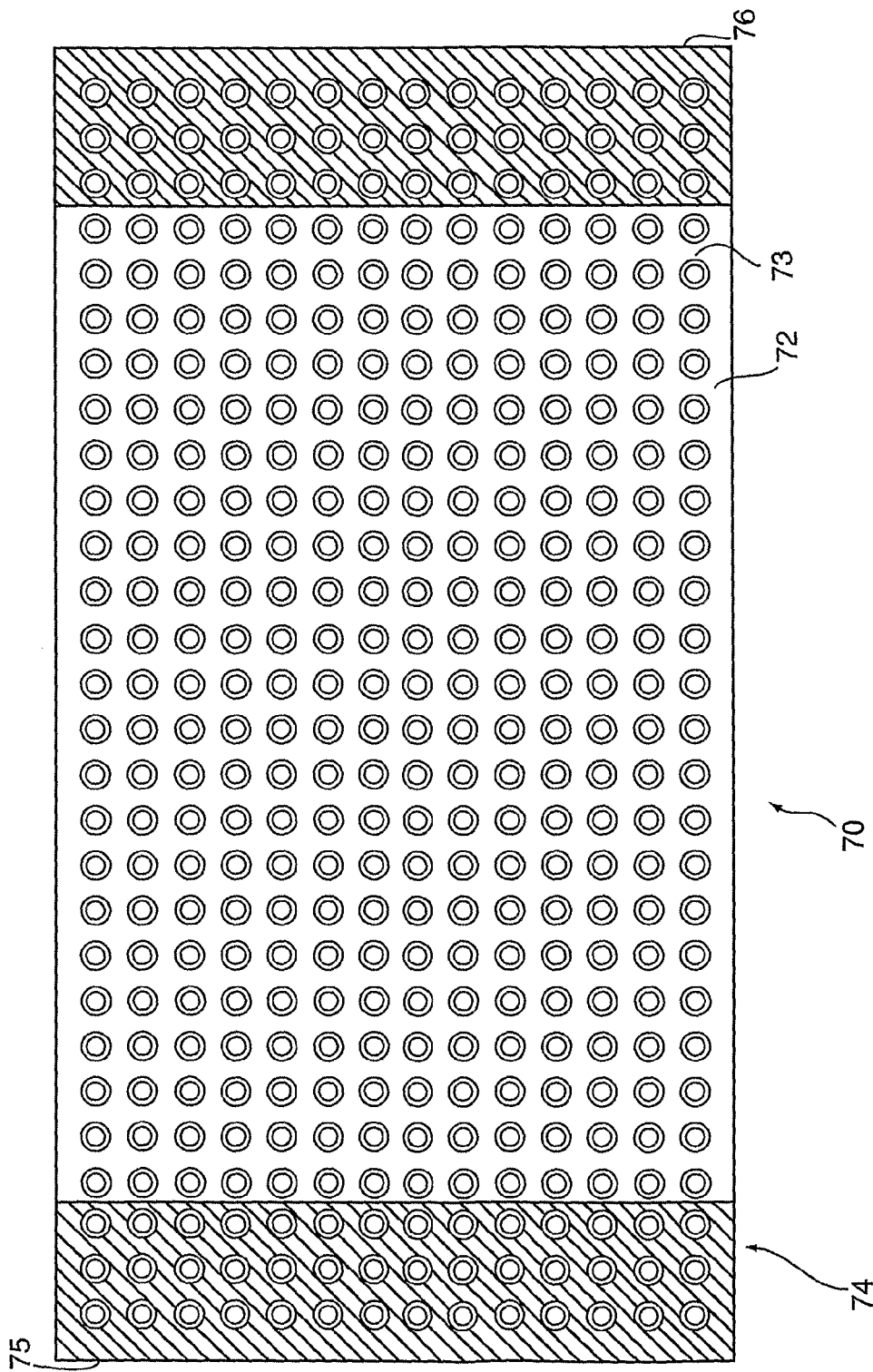
FIG. 8 is a top plan view of another embodiment of an ADA compliant detectable tile according to the present invention featuring a contrasting color lateral edge to provide directional input.

FIG. 8 illustrates another embodiment of an ADA compliant detectable tile, generally indicated at 70, similar to the one shown in FIG. 1 that has a top surface 72 with a plurality of rows of raised truncated domes 73. The tile 70 features a symbol, generally indicated at 74, of contrasting color to the top surface of the tile. In the embodiment illustrated, the symbol 74, in this case is colored lateral edges 75,76, of contrasting color formed on the top surface of the tile. The contrasting colored edges provide contrast and draw the eye of the pedestrian to convey a strong sense of direction and centering to the intended path.

Figure 9:
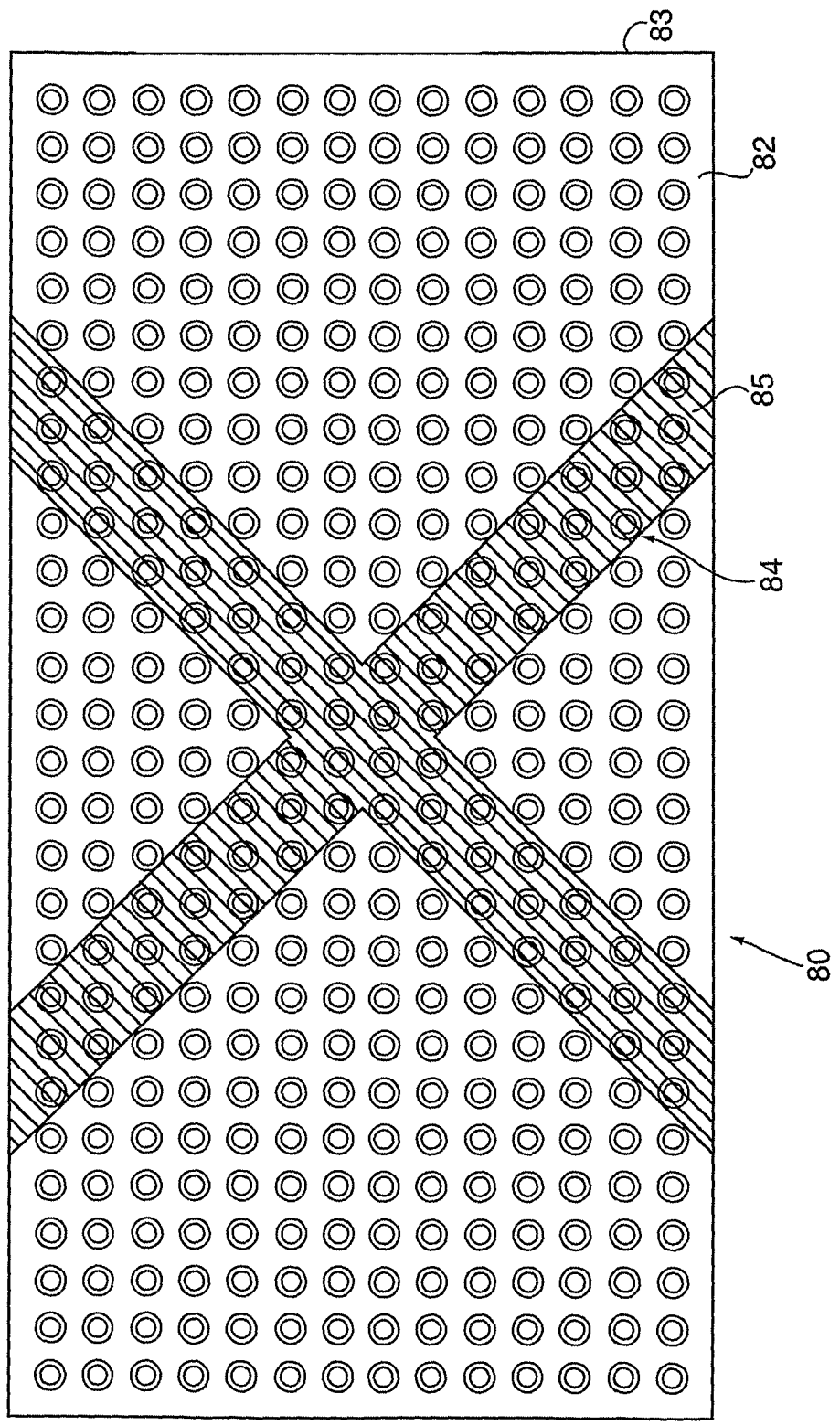
FIG. 9 is a top plan view of another embodiment of an ADA compliant detectable tile according to the present invention featuring a contrasting color symbol to convey a signal to STOP.

FIG. 9 illustrates another embodiment of an ADA compliant detectable tile, generally indicated at 80, according to the present invention similar to the one shown in FIG. 1 that has a top surface 82 with a plurality of rows of raised truncated domes 83. The tile 80 features a symbol, generally indicated at 84, of contrasting color to the top surface of the tile. In the embodiment illustrated the symbol is a colored "X" 85, of contrasting color formed on the top surface of the tile. The contrasting colored "X" provides contrast and draws the eye of the pedestrian to convey a sense of centering to the intended path to convey a signal to STOP.

Figure 10:
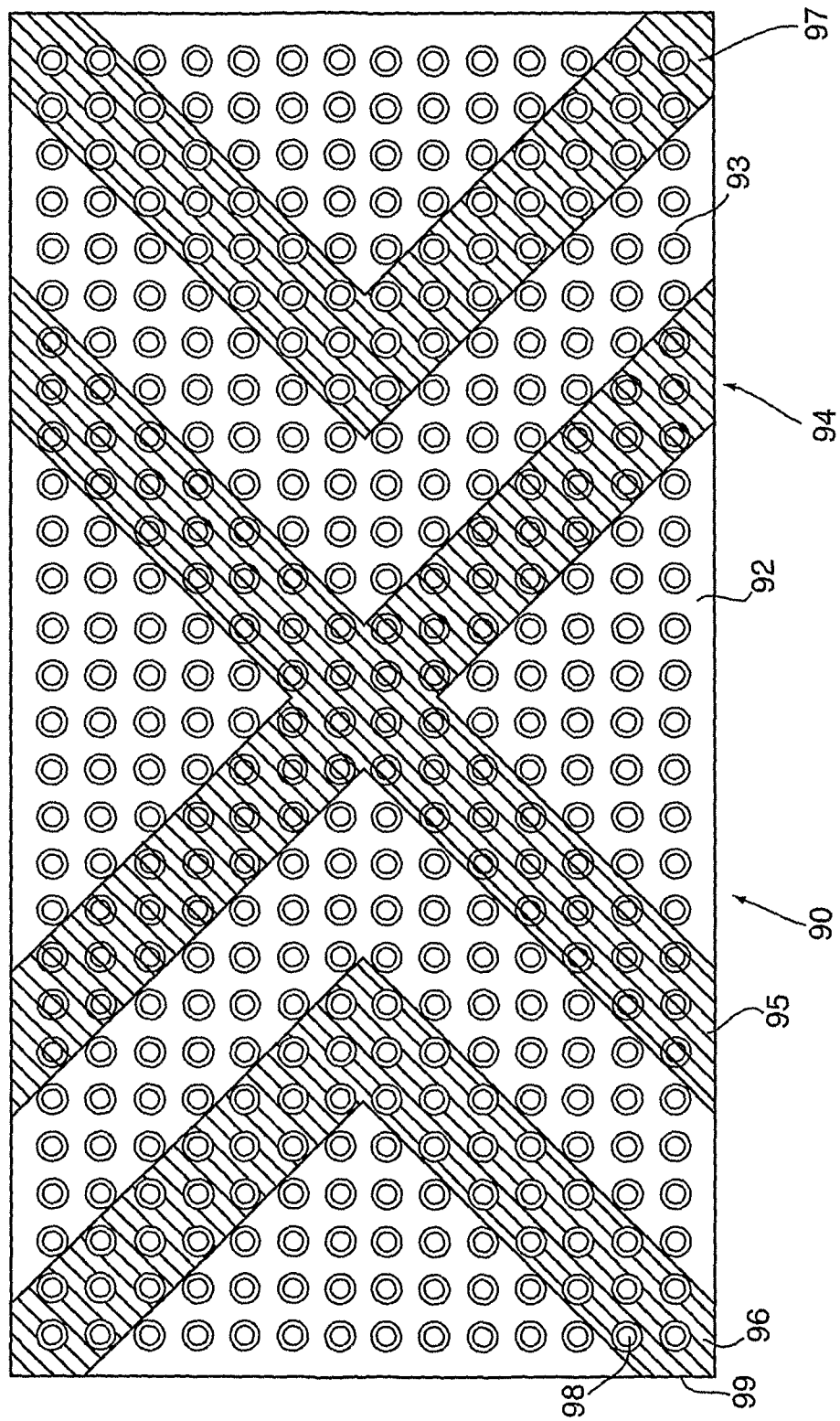
FIG. 10 is a top plan view of another embodiment of an ADA compliant detectable tile according to the present invention featuring a centrally located contrasting color symbol to convey a signal to STOP.

FIG. 10 illustrates another embodiment of an ADA compliant detectable tile, generally indicated at 90, according to the present invention similar to the one shown in FIG. 9 that has a top surface 92 with a plurality of rows of raised truncated domes 93. The tile 90 features a symbol, generally indicated at 94, of contrasting color to the top surface of the tile. In the embodiment illustrated, the symbol 94 is a colored "X" 95 with colored side arrows 96,97, both of contrasting color to the top surface of the tile. Where the tile is for example Federal Yellow, the "X"95 and side arrows 96,97 can be Onyx Black to provide the desired level of contrast. The contrasting colored "X" 95 provides contrast and draws the eye of the pedestrian to convey a sense of centering to the intended path and to convey a signal to STOP. The side arrows 96,97 reinforce the centering aspect and STOP signal. For further emphasis, the tops 98 of the domes 99 within the side arrows 96,97 may be of contrasting color to the side arrows and preferably the same color as the top surface 92 of the tile.

Figure 11:
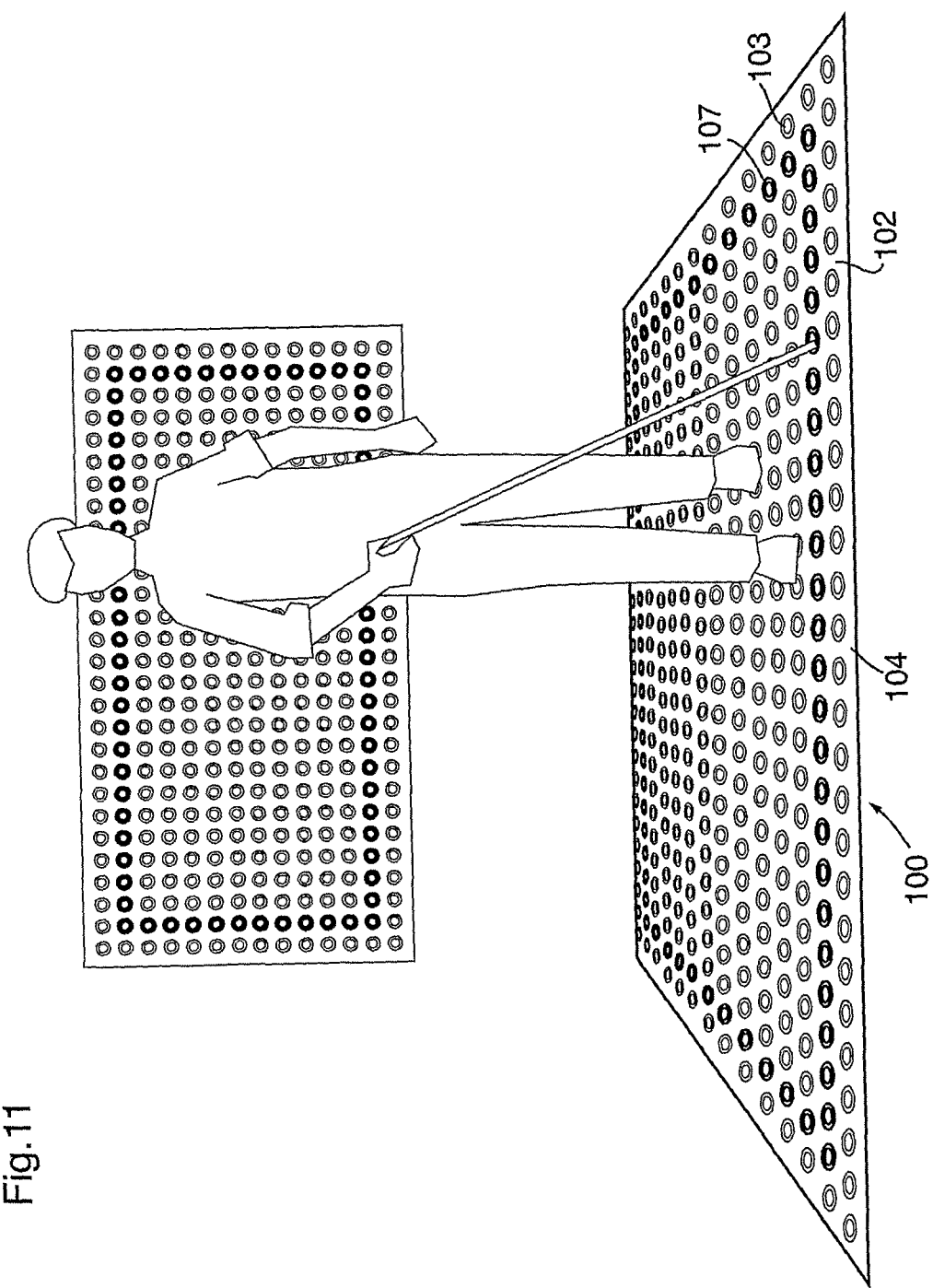
FIG. 11 is a schematic of another embodiment of an ADA compliant detectable tile according to the present invention featuring domes of contrasting color framing the tile.

FIG. 11 illustrates another embodiment of an ADA compliant detectable tile according to the present invention, generally indicated at 100, similar to the one shown in FIG. 1 that has a top surface 102 with a plurality of rows of raised truncated domes 103. The tile 100, of the present invention, features a symbol, generally indicated at 104, of contrasting color to the top surface of the tile. In the embodiment illustrated, the symbol 104 features contrasting color indicators. In this embodiment, internal rows of domes 107 forming an internal border 108 are of contrasting color to the other domes 109 on the top surface of the tile. Where the tile is for example Federal Yellow the internal border of domes can be Onyx Black to provide the desired level of contrast. The different colored domes provides contrast and draws the eye of the pedestrian to ensure a visual warning is provided and to add directional guidance to the intended path.

Figure 12:
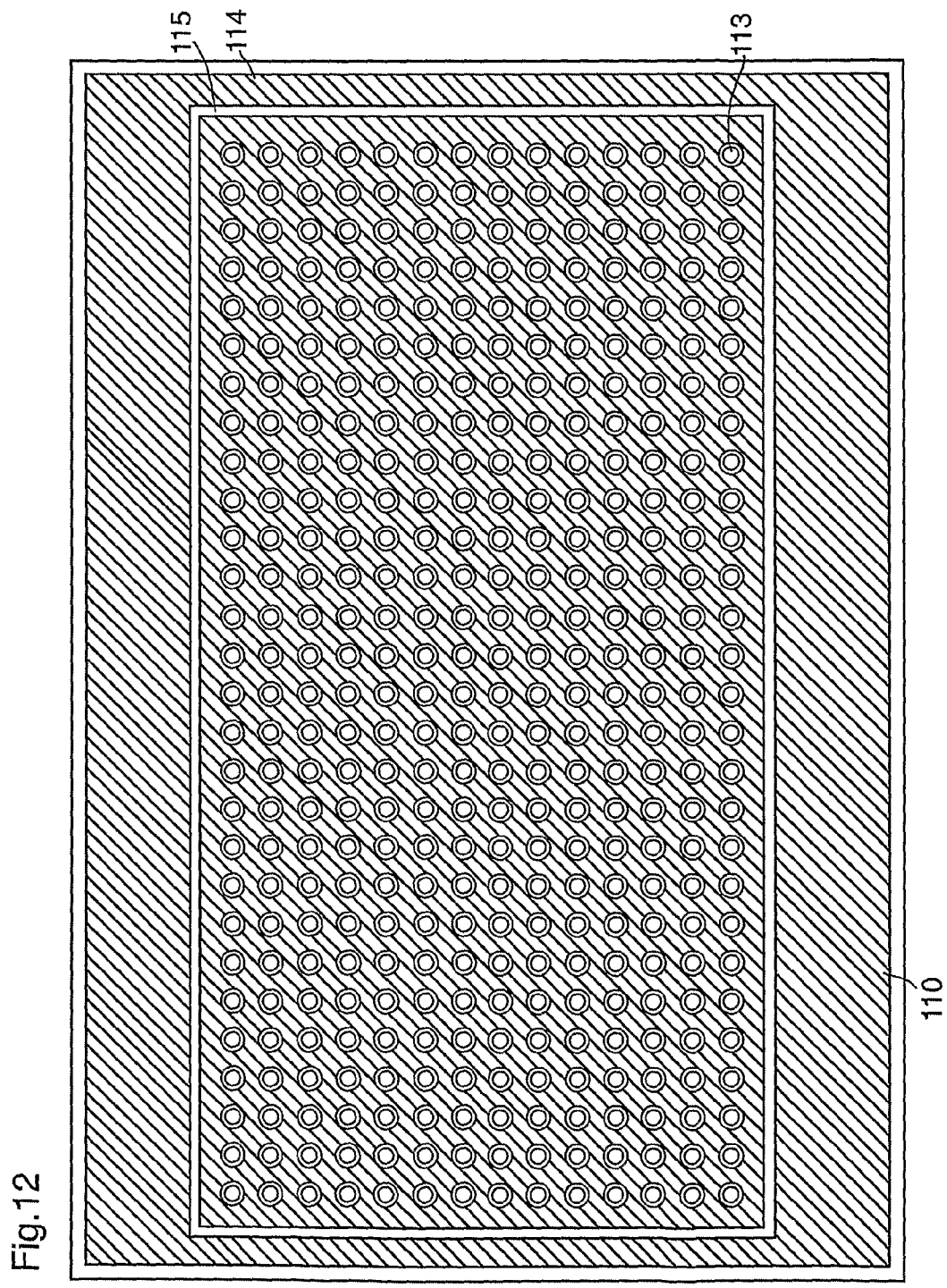
FIG. 12 is a top plan view of another embodiment of an ADA compliant detectable tile according to the present invention featuring brightly colored domes and frame and background of contrasting color.

FIG. 12 illustrates another embodiment of an ADA compliant detectable tile, generally indicated at 110, according to the present invention similar to the one shown in FIG. 1 that has a top surface 112 with a plurality of rows of raised truncated domes 113. The tile 110, of the present invention, features a symbol, generally indicated at 114, of contrasting color to the top surface of the tile. In the embodiment illustrated, the symbol 114 is brightly colored domes 113 and outer frame 115 of contrasting color to the top surface 112 of the tile 110. In this embodiment the brightly colored domes 113 and frame 110 provide contrast and draw the eye of the pedestrian to ensure a visual warning is provided and to add directional guidance to the intended path.

Figure 13:
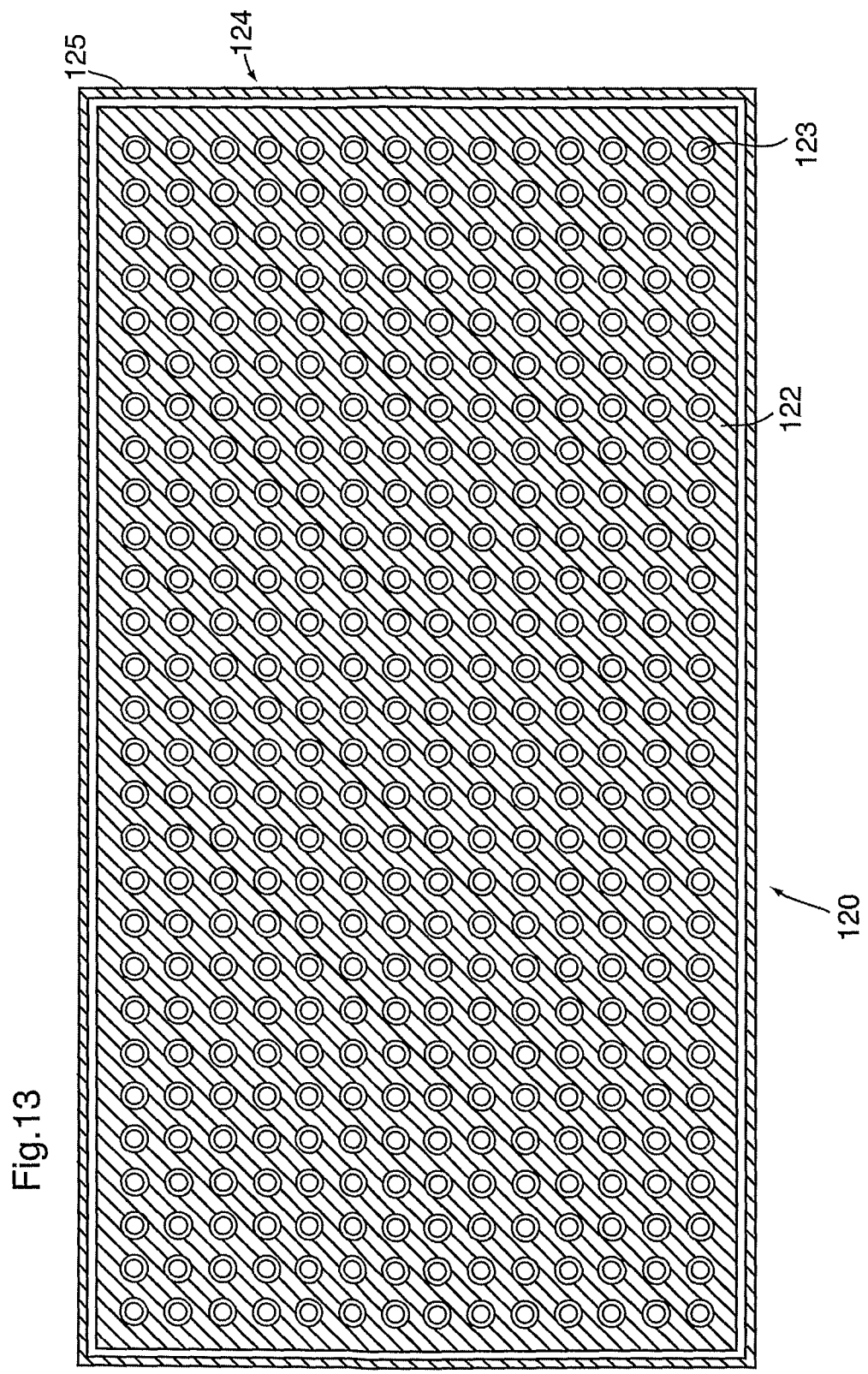
FIG. 13 is a top plan view of another embodiment of an ADA compliant detectable tile according to the present invention featuring luminescent domes and frame and background of contrasting color according to the present invention.

FIG. 13 illustrates another embodiment of an ADA compliant detectable tile, generally indicated at 120, according to the present invention similar to the one shown in FIG. 12 having a top surface 122 with a plurality of rows of raised truncated domes 123. The tile 120, of the present invention, features a symbol, generally indicated at 124, of contrasting color to the top surface of the tile. In the embodiment illustrated, the symbol 124 is brightly colored domes 123 and outer frame 125 of contrasting color to the top surface 122 of the tile. In this embodiment the brightly colored domes 123 and frame 125 are luminescent.

Figure 14:
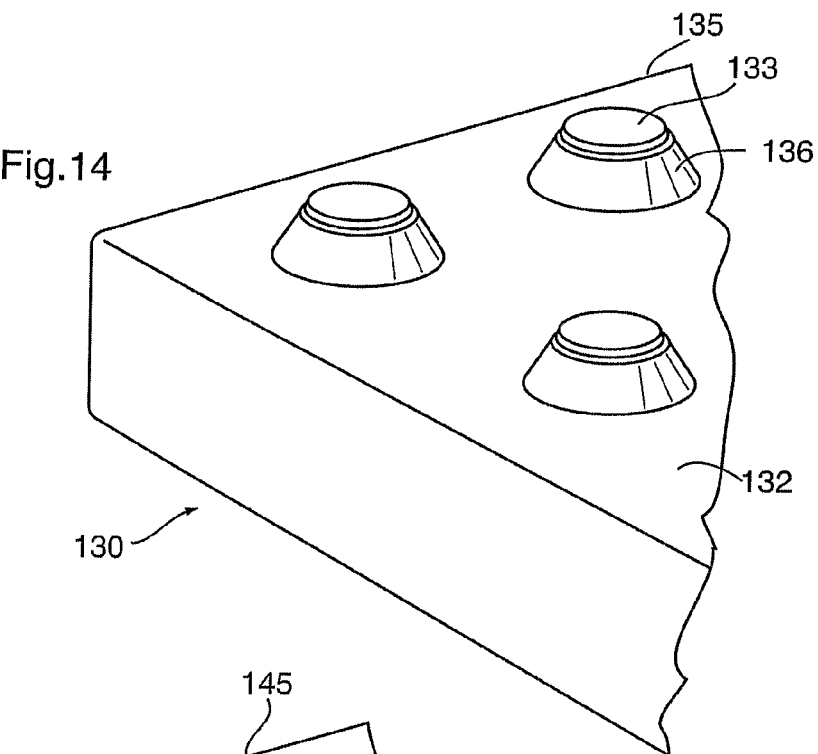
FIG. 14 is a schematic view of domes on an ADA compliant detectable tile according to the present invention featuring domes co-molded of contrasting color.

FIG. 14 illustrates another method according to the present invention of providing contrasting color on the top surface 132 of a tile 130 having a plurality of rows of raised truncated domes 133 to give visual contrast. FIG. 14 illustrates schematically, domes, generally indicated at 133, on the top surface 132 of a section of an ADA compliant detectable tile 130 (partial section shown only) where the domes 133 are co-molded of contrasting color. In addition the domes 133 could be made of different material from the rest of the tile to provide durability from loads and forces experienced under load, to provide a better non-skid surface, change the texture or feel of the domes etc. In the embodiment illustrated the sides 135 of the domes are a contrasting color to the top 136 of the domes and the tile surface 132. Where the tile is for example Federal Yellow the sides of the domes can be Onyx Black to provide the desired level of contrast. In addition the sides of the domes could be made of different material from the rest of the tile to provide enhanced durability from loads and forces experienced under load, to provide a better non-skid surface, change the texture or feel of the domes etc.

Figure 15:
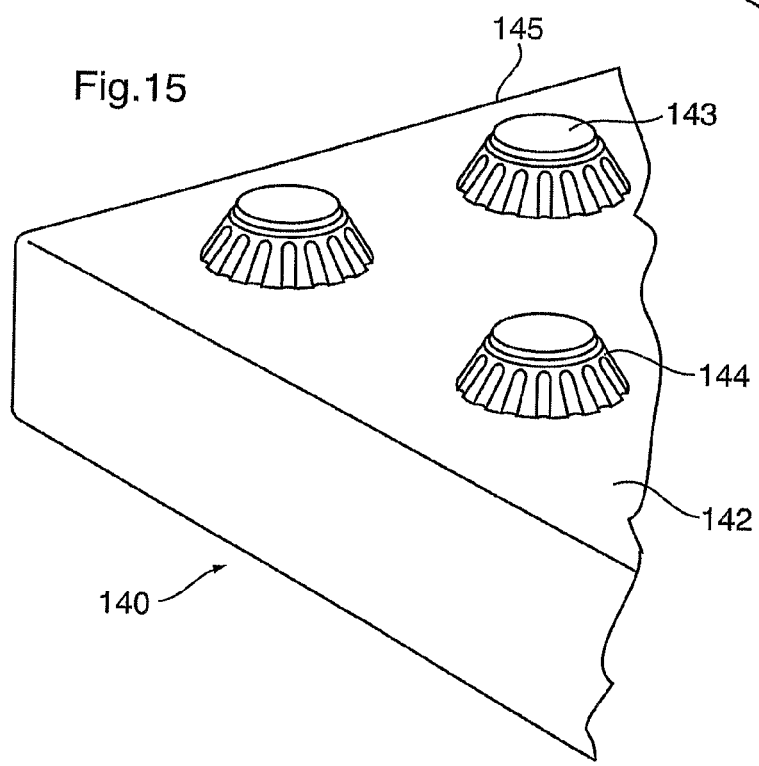
FIG. 15 is a schematic view of domes on an ADA compliant detectable tile according to the present invention featuring domes co-molded of contrasting color with contrasting colored grooves on the side of the domes.

FIG. 15 illustrates another method according to the present invention of providing contrasting color on the top surface 142 of a tile 140 having a plurality of rows of raised truncated domes, generally indicated at 143, to give visual contrast. FIG. 15 schematically shows domes 143 on a section of an ADA compliant detectable tile 140 where the domes 143 are co-molded of contrasting colors and have side grooves 144 (or alternatively rings, not shown) molded into the side walls 145 of the domes 143 and being of a different color to the rest of the side wall 145 of the domes. This provides a shadow effect to the dome rendering it more visible. Where the tile is for example Federal Yellow the sides of the domes can be Onyx Black and the side grooves Federal Yellow to provide the desired level of contrast. A similar use of contrasting colored grooves or rings or depressions or modified dome shape can be applied to the top of the dome or around the base of the dome to make them more visible. If directional information is required it may be possible to make the domes elliptical to add directional input.

Figure 16:
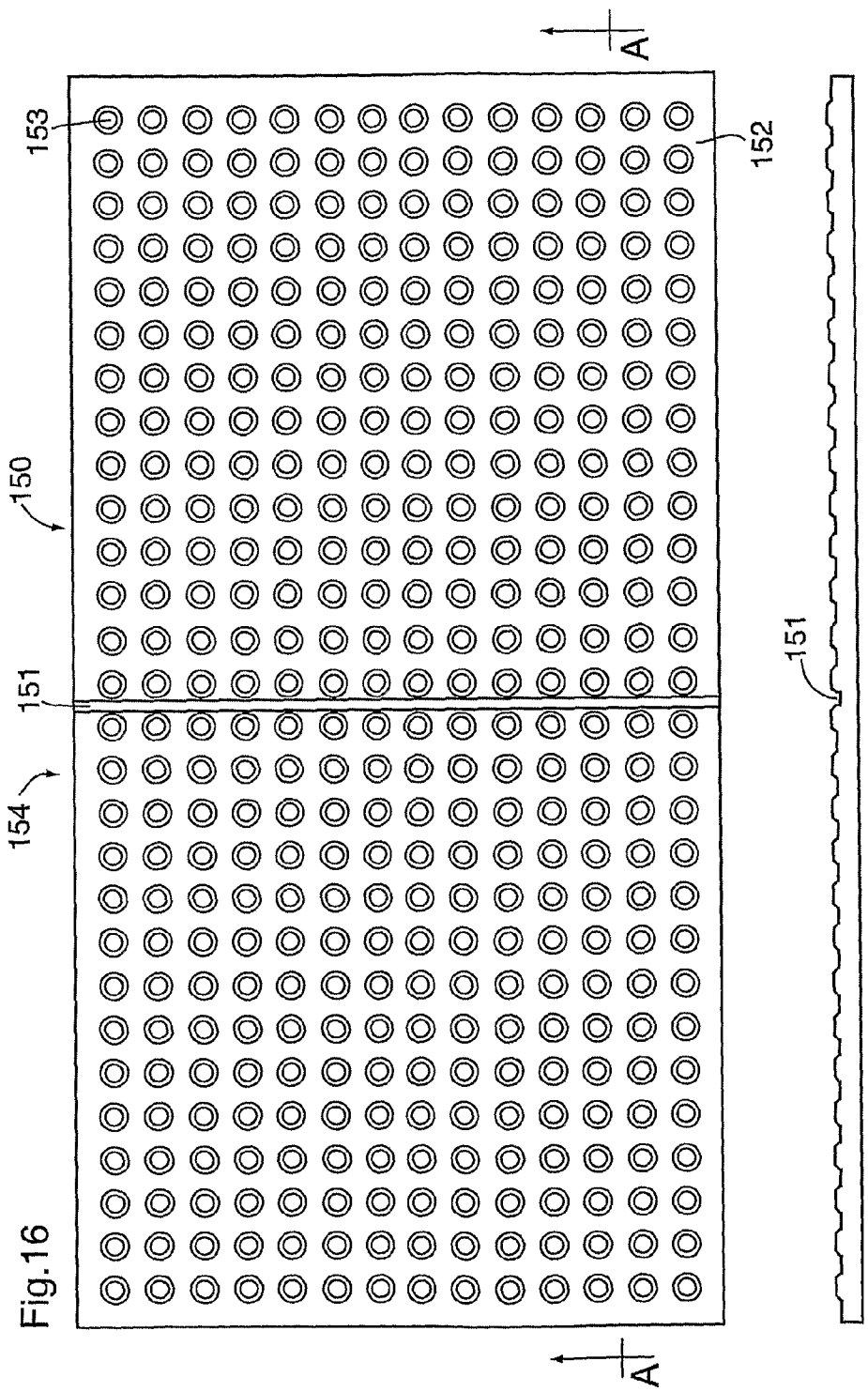
FIG. 16 is a top plan view of another embodiment of an ADA compliant detectable tile according to the present invention featuring a centering groove on the tile to provide directional information.

FIG. 16 illustrates another embodiment of an ADA compliant detectable tile, generally indicated at 150, according to the present invention and generally of the type described in U.S. Pat. Nos. 5,303,669 and 5,775,835 or the like, that has a top surface 152 with a plurality of rows of raised truncated domes 153. The tile 150 features a symbol or other indicia, generally indicated at 154, applied to the top surface of tile. In the embodiment illustrated the tile 150 is formed where the symbol or indicia is a centering groove 151 in the top surface 152 of the tile between adjacent rows of domes 153. A visually impaired pedestrian can use his or her cane to follow the groove 152 along the intended direction of travel. The centering groove 151 can be made photo luminescent to be more visible to the sighted.

Figure 17:
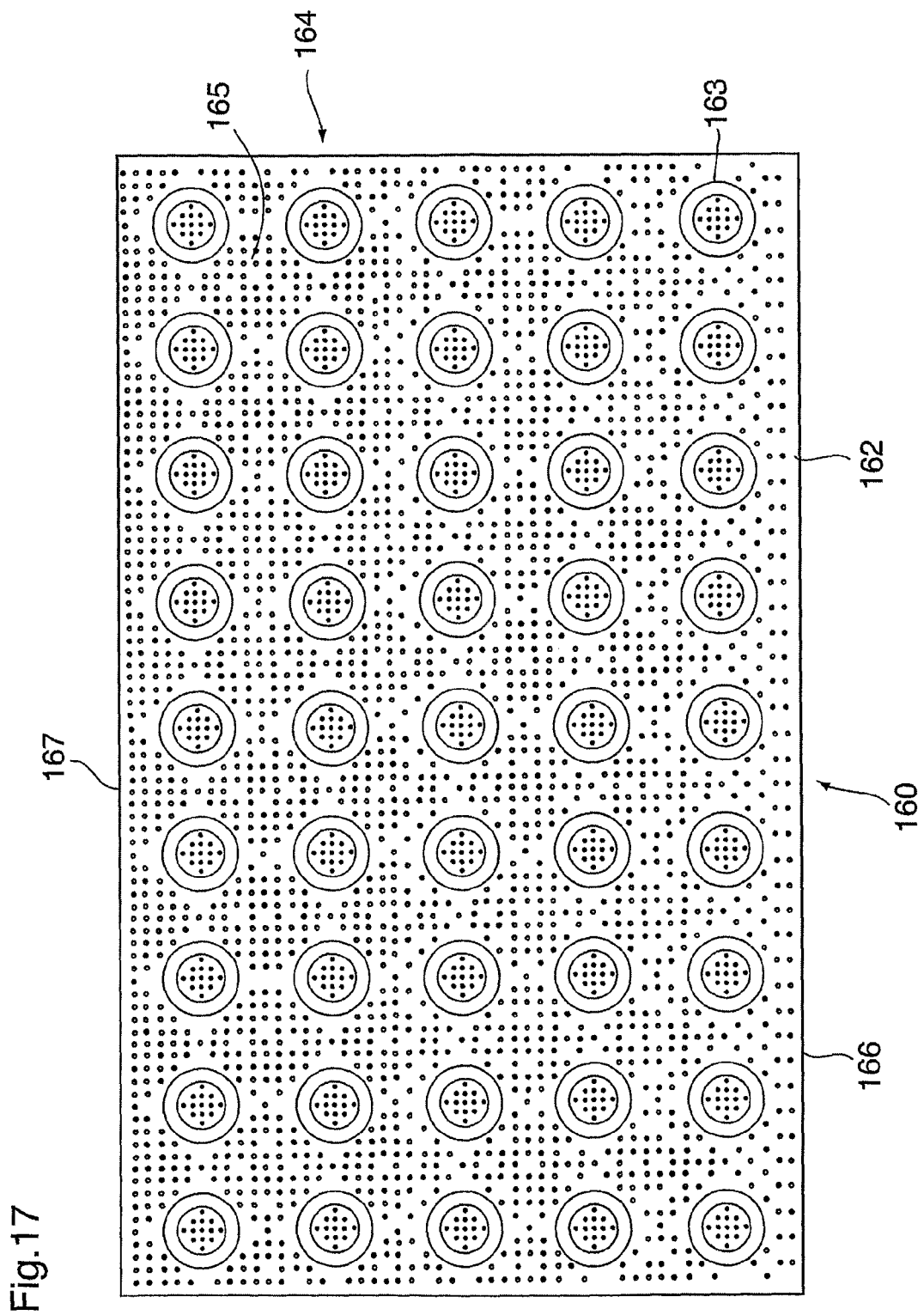
FIG. 17 is a top plan view of another embodiment of an ADA compliant detectable tile according to the present invention featuring texture between domes of contrasting density to provide directional information.

FIG. 17 illustrates another embodiment of an ADA compliant detectable tile, generally indicated at 160, according to the present invention and generally of the type described in U.S. Pat. Nos. 5,303,669 and 5,775,835 or the like, that has a top surface 162 with a plurality of rows of raised truncated domes 163. The tile 163 features a symbol or indicia, generally indicated at 164, on the top surface of the tile to provide directional guidance. In the embodiment illustrated, the tile 160 has texture, generally indicated at 165, between rows of domes 163 to provide an anti-slip surface to the top surface 162 of tile 160. According to the present invention in the embodiment illustrated, the tile 160 is formed with texture 165 between domes of contrasting density to provide directional information. On the rear side 166 (side facing away from the hazard) of the tile the density of the texture between domes is less than between domes on the street side 167 (side facing the hazard) of the tile. The transitional density of the texture provides audible location awareness when the difference in density is detected by cane. Low density texture between domes at the rear of the tile provides slower vibration feedback and tones from the cane. As density increases faster vibration feedback and tones are received.

Figure 18:
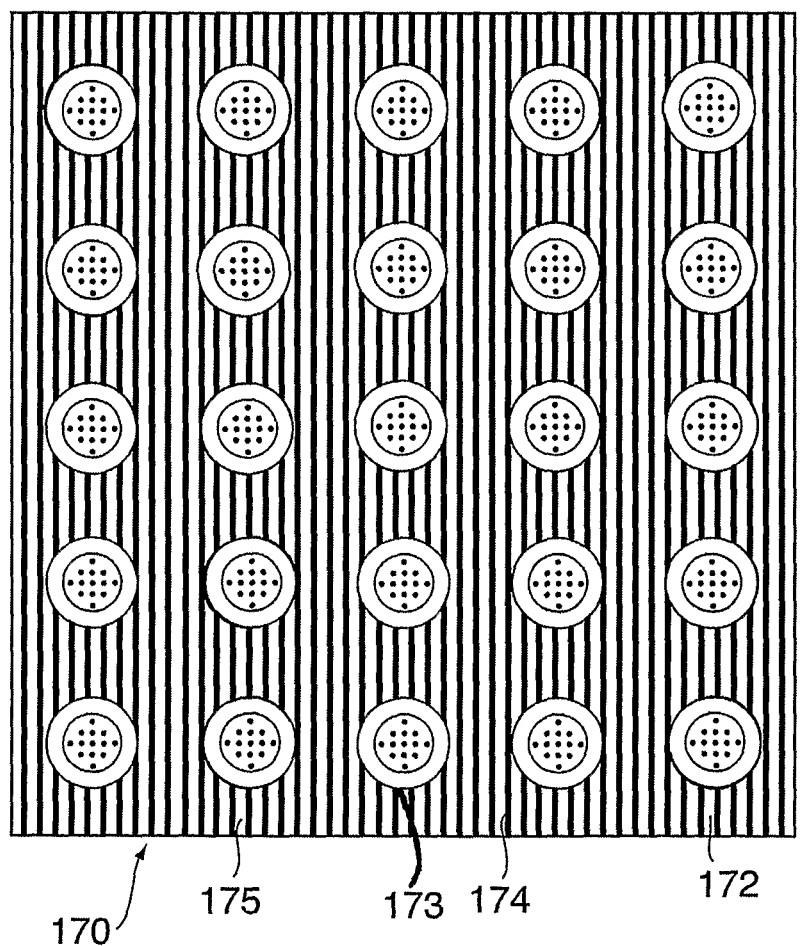
FIG. 18 is a top plan view of another embodiment of an ADA compliant detectable tile according to the present invention featuring texture between domes in the form of lineal grooves to provide directional information.

FIG. 18 illustrates another embodiment of an ADA compliant detectable tile, generally indicated at 170, according to the present invention having a top surface 172 with a plurality of rows of raised truncated domes 173. The tile 170 features indicia, generally indicated at 174, to provide additional direction information. In the embodiment illustrated, the indicia 174 comprises texture between domes 173 in the form of lineal grooves 175 to provide directional information. The texture rather than being individual dimples as in FIG. 18 is in the form of lineal grooves between domes. The lineal grooves provide slip resistance but have a lower profile than the use of dimples in FIG. 18. This provides improved detectability and traction. The lineal grooves can be used to provide guidance information as well and can also be photo luminescent.

Figure 19A:
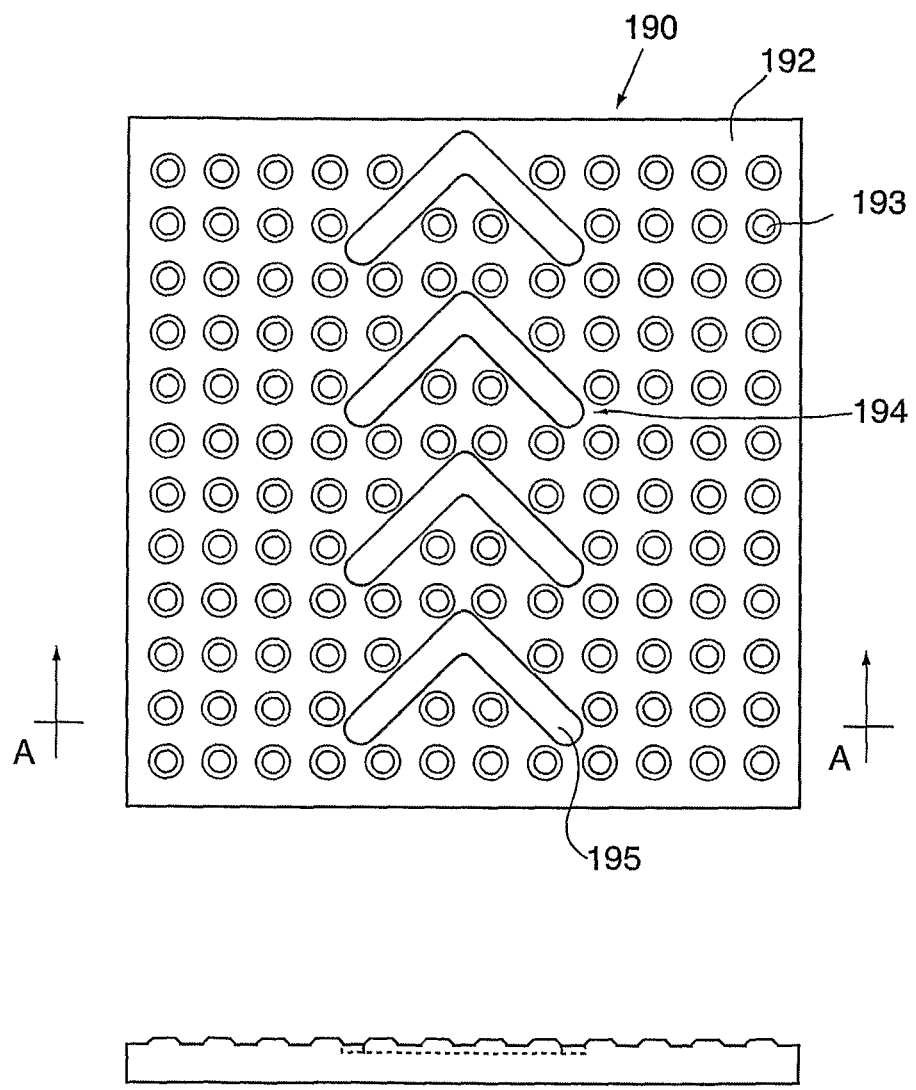
Figure 19C:
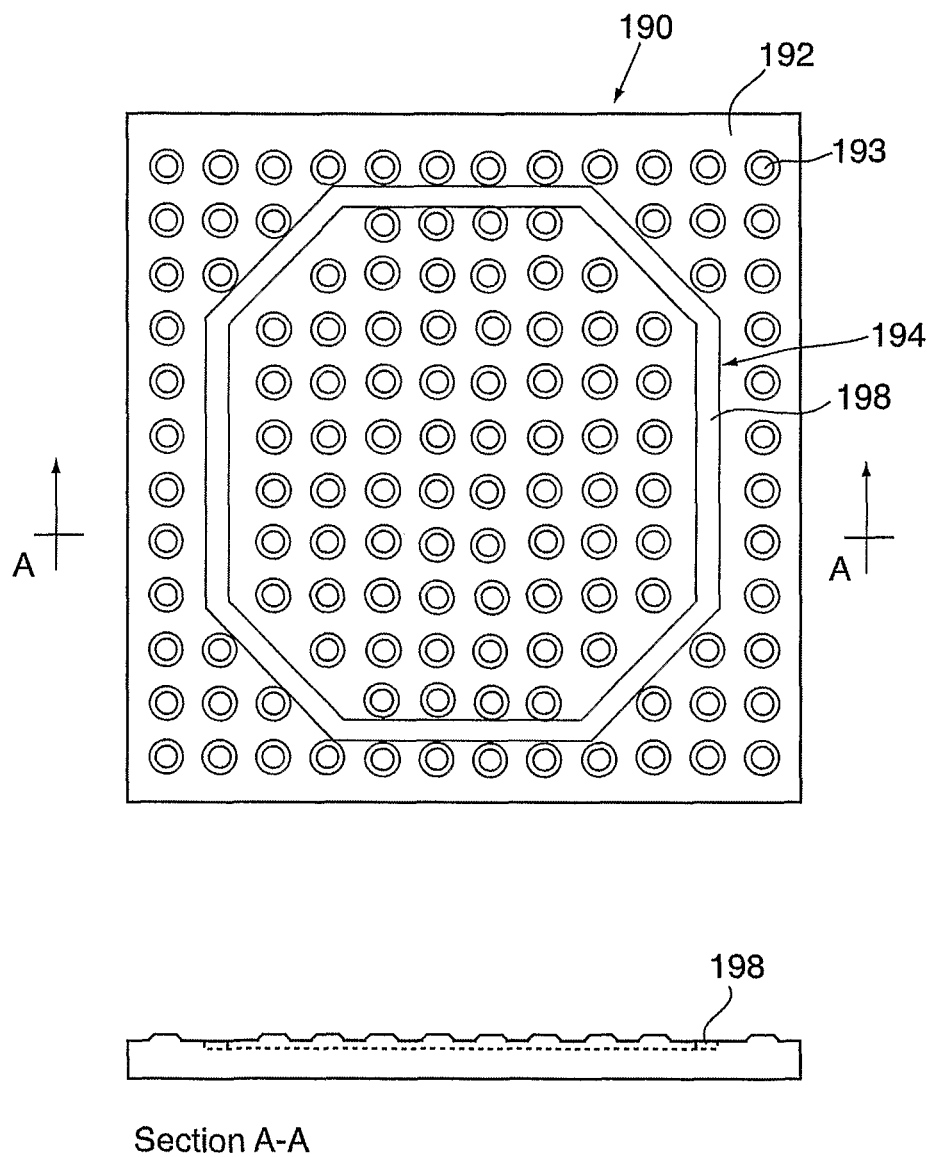

FIGS. 19A-D illustrate other embodiments of ADA compliant detectable tiles, generally indicated at 190, according to the present invention and generally of the type described in U.S. Pat. Nos. 5,303,669 and 5,775,835 or the like, that have a top surface 192 with a plurality of rows of raised truncated domes 193. The tiles 190 features a symbol or indicia, generally indicated at 194, on the top surface of the tile to provide additional directional information. In the embodiment illustrated the tiles 190 are formed with one or more grooves 195 in the top surface 192 of the tile between adjacent rows of domes 193 forming a pattern. For example in FIG. 19A the grooves 195 form a pattern of chevrons indicating an intended direction of travel. In FIG. 19B the pattern is of two pairs of oppositely aligned chevrons 196,197 indicating "entry-exit". In FIG. 19C the grooves form a hexagon 198 indicating the pedestrian should STOP. In FIG. 19D the grooves form an outline for an "X" 199 indicating a railway crossing. A visually impaired pedestrian can use his or her cane to identify the pattern of grooves to obtain the guidance information. The pattern of grooves can be made photo luminescent.

FIG. 20 illustrates another embodiment of an ADA compliant detectable tile, generally indicated at 210 according to the present invention that has a top surface 212 with a plurality of rows of raised truncated domes 213. The tile 210 features a symbol or other indicia, generally indicated at 214, to provide a visual contrast and or directional information. In the embodiment illustrated, the symbol 214 is a photoluminescence strip 215 on one edge 116 of the tile to assist with the ability of the pedestrian to detect the base of a curb ramp or edge of the platform or location of hazardous vehicular way that the tile is intended to provide notice of the both visually impaired and sighted pedestrians. FIG. 20A illustrates the tile 210 of FIG. 20 in cross-section. In the embodiment illustrated the photoluminescence strip 215 is raised relative to the top surface 212 of the tile. The provision of a raised photoluminescence strip 215 on one edge 217 of the tile will enable detection by cane to warn the visually impaired of the base of the curb ramp, edge of platform, or location of a hazardous vehicular way. The photoluminescence strip 215 may be provided with drainage grooves 216 to eliminate ponding of water and will help reduce ice forming on the top surface 212 of the tile.

Figure 22:
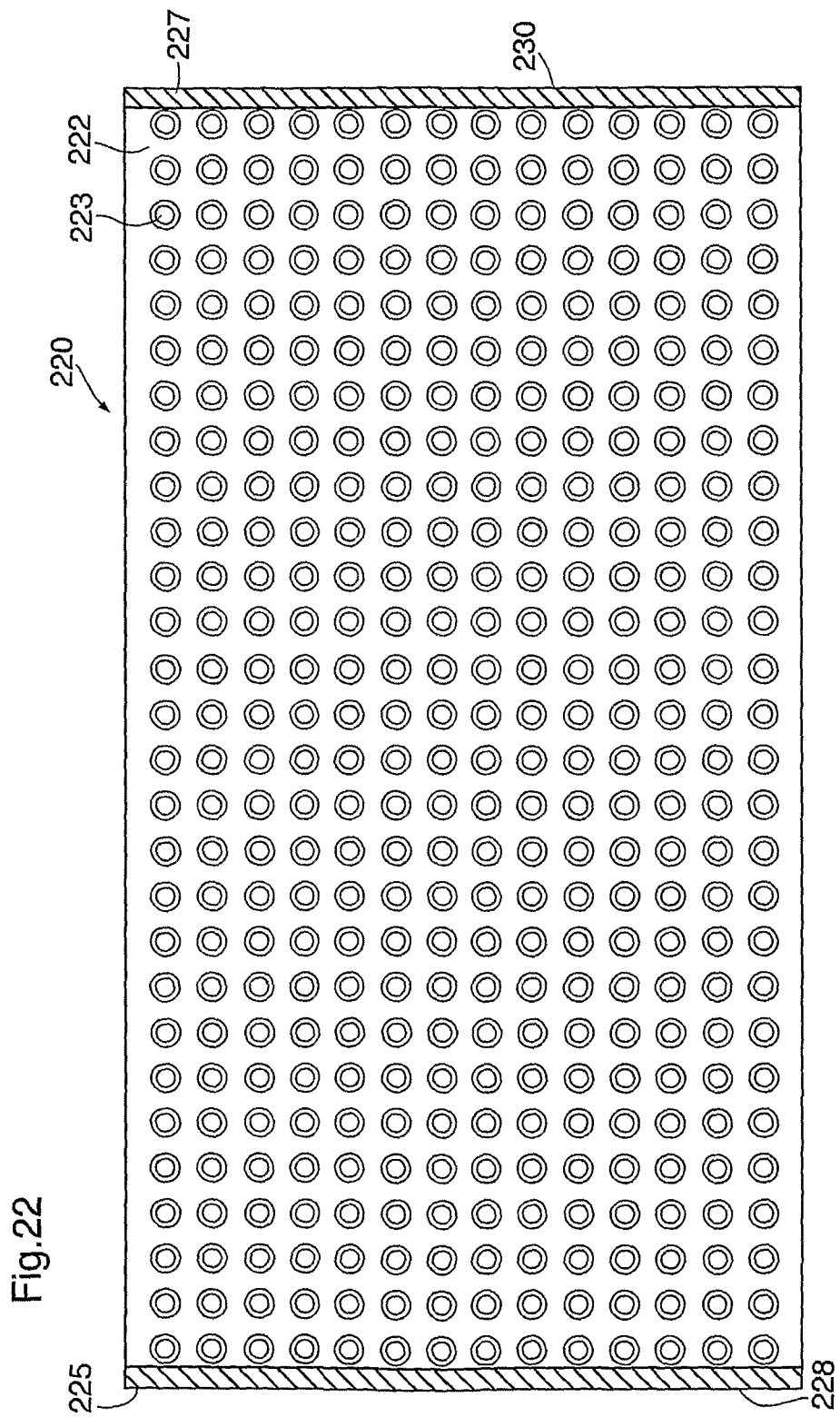
FIG. 22 is a top plan view of another embodiment of ADA compliant detectable tiles according to the present invention featuring photoluminescent strips on each end of the tile to provide direction of travel guidance.

FIG. 21 illustrates another embodiment of an ADA compliant detectable tile, generally indicated at 220 according to the present invention that has a top surface 222 with a plurality of rows of raised truncated domes 223. The tile 220 features a symbol or other indicia, generally indicated at 224, to provide a visual contrast and or directional information. In the embodiment illustrated, the symbol 224 is photoluminescence strips 225, 226, 227 on the edges 228,229,230 of the tile to assist with the ability of the pedestrian to not only detect the base of a curb ramp or edge of the platform or location of hazardous vehicular way at edge 229 but to provide directional information between edges 228, 230. Where each of the photoluminescence strips 225, 226, 227 is raised relative to the top surface 222 of the tile the strips will be detectable by cane to warn the visually impaired and/or provide guidance information. FIG. 22 is a variation of the tile of FIG. 21 with the photoluminescence strips 225, 227 along edges 228 and 230.

Figure 23:
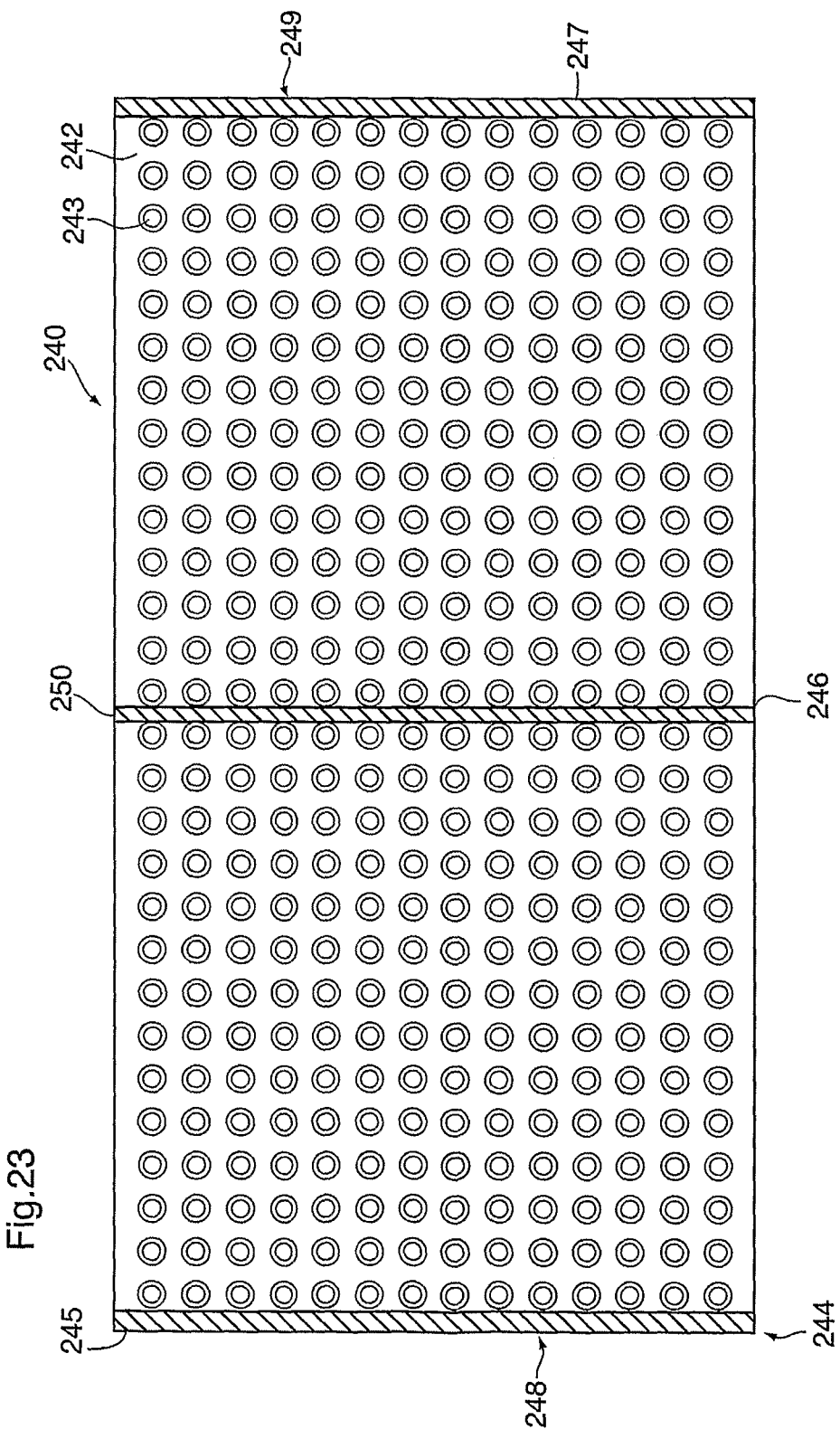
FIG. 23 is a top plan view of another embodiment of ADA compliant detectable tiles according to the present invention featuring photoluminescent strips on each and in the centre of the tile to provide direction of travel guidance.

FIG. 23 illustrates another embodiment of an ADA compliant detectable tile, generally indicated at 240 according to the present invention that has a top surface 242 with a plurality of rows of raised truncated domes 243. The tile 240 features a symbol or other indicia, generally indicated at 244, to provide a visual contrast and or directional information. In the embodiment illustrated, the symbol 244 is photoluminescence strips 245, 246, 247 on the edges 248,249, and center 250 of the tile to provide directional information between edges 248, 249. Where each of the photoluminescence strips 245, 246, 247 is raised relative to the top surface 242 of the tile the strips will be detectable by cane.

Having illustrated and described preferred embodiments of the invention and certain possible modifications thereto, it should be apparent to those of ordinary skill in the art that the invention permits of further modification in arrangement and detail. It will be appreciated that the dimensions can be varied widely subject to the ADA Guidelines, as desired to suit the particular application. Tile size, length, width, thickness, color, ribbing and surface profiles can be modified to suit specific project requirements. In addition combinations of tiles with different indicia can be used. All such modifications are covered by the scope of the invention.

What is claimed is:

1. An ADA compliant detectable warning tile comprising:
   a top surface including upwardly protruding truncated domes and first and second colored areas;
   wherein the color of the first area contrasts with the color of the second area so as to create a visual warning for pedestrians;
   wherein the tile is adapted to be installed in a pedestrian walkway; and
   wherein the a colored region of first area is shaped as a symbol that adds directional guidance to the tile.

2. The tile of claim 1 wherein the colored region of the first area is a border surrounding the periphery of the top surface.

3. The tile of claim 1 wherein the colored region of the first area is a rectangular strip located along one edge of the top surface.

4. The tile of claim 2, wherein the colored region of the first area is not uniform thickness surrounding the periphery.

5. The tile of claim 1, wherein at least a portion of the colored region of the first area is shaped as a triangle.

6. The tile of claim 1, wherein at least a portion of the colored region of the first area is shaped as a plurality of chevrons.

7. The tile of claim 1, wherein at least a portion of the colored region of the first area is shaped as a cross.

8. The tile of claim 1, wherein at least a portion of the colored region of the first area is shaped as a circle.

9. The tile of claim 1, wherein at least a portion of the colored region of the first area is shaped as a square.

10. The tile of claim 1, wherein at least a portion of the colored region of the first area is shaped as an "X".

11. The tile of claim 1, wherein at least a portion of the colored region of the first area is shaped as a hexagon.

12. The tile of claim 1, wherein at least a portion of the colored region of the first area is photoluminescent.

* * * * *